(12) United States Patent
Rothman

(10) Patent No.: US 10,413,847 B2
(45) Date of Patent: Sep. 17, 2019

(54) MINERAL SEPARATION USING FUNCTIONALIZED POLYMER OR POLYMER-COATED FILTERS AND MEMBRANES

(71) Applicant: CiDRA Corporate Services Inc., Wallingford, CT (US)

(72) Inventor: Paul J. Rothman, Windsor, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 583 days.

(21) Appl. No.: 14/364,439

(22) PCT Filed: Dec. 13, 2012

(86) PCT No.: PCT/US2012/069402
§ 371 (c)(1),
(2) Date: Jun. 11, 2014

(87) PCT Pub. No.: WO2013/112240
PCT Pub. Date: Aug. 1, 2013

(65) Prior Publication Data
US 2014/0339172 A1 Nov. 20, 2014

Related U.S. Application Data

(60) Provisional application No. 61/569,870, filed on Dec. 13, 2011.

(51) Int. Cl.
*B03D 1/02* (2006.01)
*C02F 1/24* (2006.01)
(Continued)

(52) U.S. Cl.
CPC ............ *B01D 15/36* (2013.01); *B01J 20/328* (2013.01); *B01J 20/3212* (2013.01);
(Continued)

(58) Field of Classification Search
CPC . B01D 15/36; B03D 1/023; C02F 1/24; C02F 1/285; C02F 2103/10
See application file for complete search history.

(56) References Cited

U.S. PATENT DOCUMENTS

| | | |
|---|---|---|
| 2,002,066 A | 5/1935 | Taylor |
| 4,657,666 A * | 4/1987 | Snook ...................... B03C 1/01 209/214 |

(Continued)

FOREIGN PATENT DOCUMENTS

| | | |
|---|---|---|
| FR | 2187421 | 1/1974 |
| GB | 1399614 | 7/1975 |

(Continued)

OTHER PUBLICATIONS

WO2009010422 English Language Abstract (1 page).

*Primary Examiner* — Patrick J Orme
(74) *Attorney, Agent, or Firm* — Ware, Fressola, Maguire & Barber LLP

(57) ABSTRACT

An apparatus for collecting mineral particles in a slurry or the tailings is disclosed. The apparatus may take the form of a filter, a conveyor belt or an impeller to be used in a processor to collect mineral particles in the slurry, or in a tailings pond to collect mineral particles in the tailings. The filter, conveyor belt or impeller has a collection area made of or coated with a polymer or a polymer-coated material having a functional group, either anionic or cationic to attach to the mineral particles. Alternatively, the synthetic material has hydrophobic molecules to render the collection area hydrophobic. When the mineral particles in the slurry or tailings are combined with collector molecules, the mineral particles also become hydrophobic. The hydrophobic mineral particles are attracted to the hydrophobic collection area. The filter, conveyor belt and impeller may have a (Continued)

plurality of passage ways in order to increase the contacting surfaces.

13 Claims, 14 Drawing Sheets

(51) Int. Cl.
- *C02F 1/28* (2006.01)
- *B01D 15/36* (2006.01)
- *B01J 20/32* (2006.01)
- *C02F 1/42* (2006.01)
- *C02F 101/20* (2006.01)
- *C02F 103/10* (2006.01)

(52) U.S. Cl.
CPC .......... *B01J 20/3293* (2013.01); *B03D 1/023* (2013.01); *C02F 1/24* (2013.01); *C02F 1/285* (2013.01); *C02F 1/42* (2013.01); *C02F 2101/20* (2013.01); *C02F 2103/10* (2013.01)

(56) References Cited

U.S. PATENT DOCUMENTS

| | | | |
|---|---|---|---|
| 6,372,882 | B1 | 4/2002 | Phillips et al. |
| 7,150,357 | B2 * | 12/2006 | Rodopoulos ........... B03D 1/006 209/166 |
| 7,641,863 | B2 | 1/2010 | Doktycz et al. |
| 2008/0308466 | A1 | 12/2008 | Lumsden |
| 2008/0311337 | A1 * | 12/2008 | Veinot ................... B32B 37/24 428/90 |
| 2010/0021370 | A1 | 1/2010 | Nagaraj et al. |
| 2010/0098607 | A1 | 4/2010 | Davis et al. |
| 2010/0200510 | A1 | 8/2010 | Domke et al. |

FOREIGN PATENT DOCUMENTS

| | | | | |
|---|---|---|---|---|
| WO | 2002066168 | | 8/2002 | |
| WO | WO2002066168 | * | 8/2002 | ............ B03D 1/016 |
| WO | 2009010422 | | 1/2009 | |
| WO | 2012162591 | | 11/2012 | |

* cited by examiner

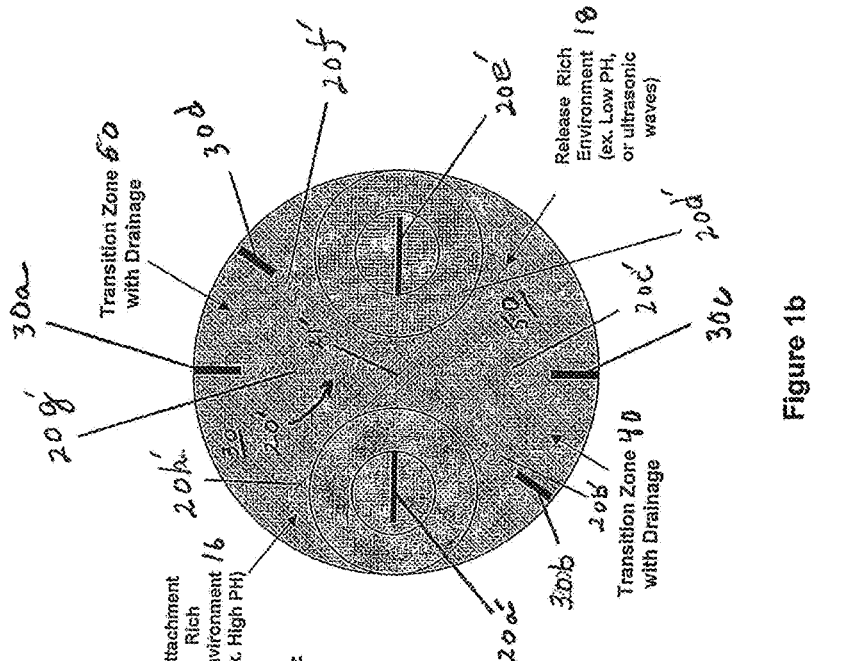
Figure 1b
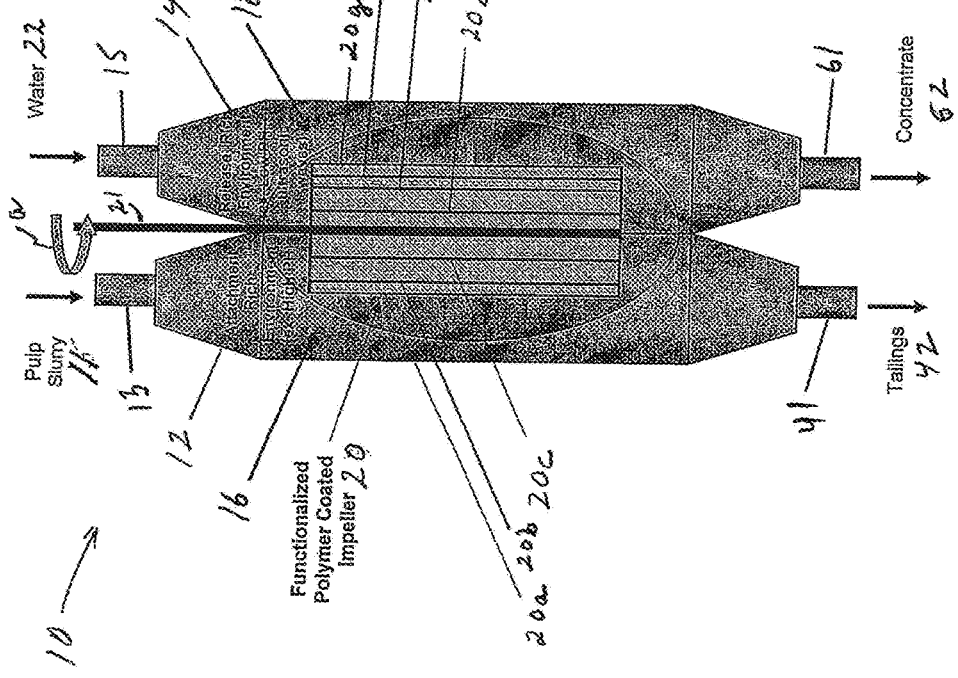
Figure 1a
Figure 1

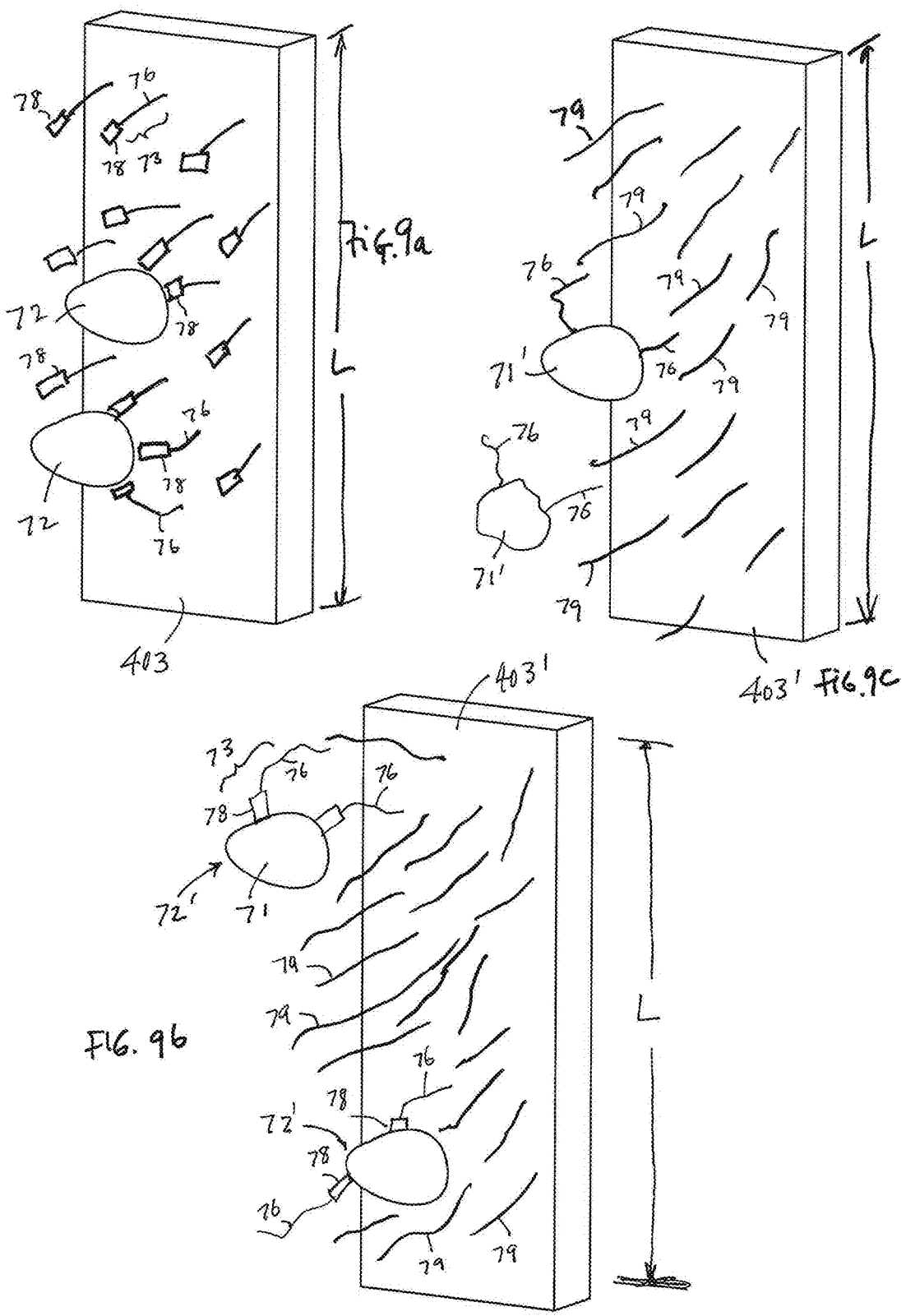

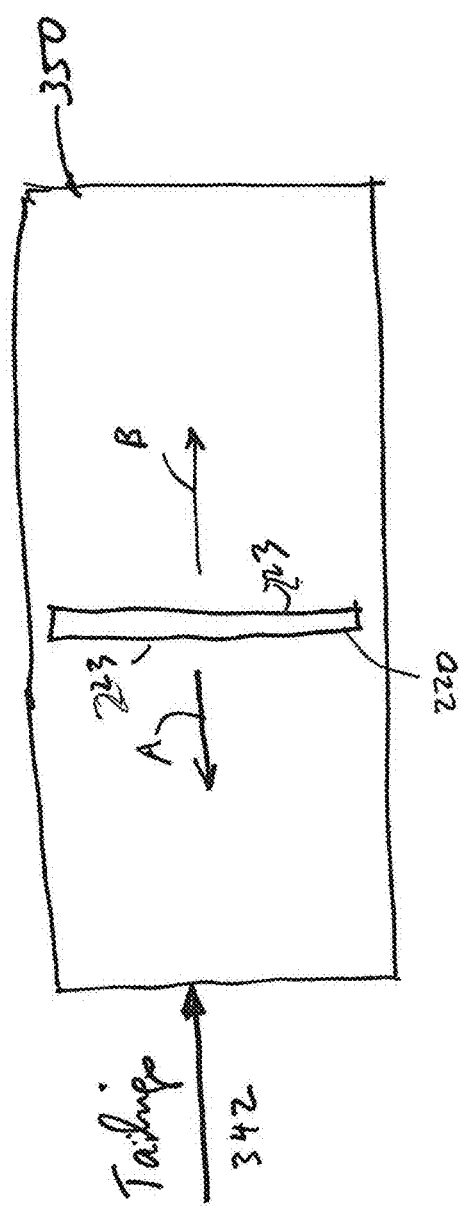

MINERAL SEPARATION USING FUNCTIONALIZED POLYMER OR POLYMER-COATED FILTERS AND MEMBRANES

CROSS-REFERENCE TO RELATED APPLICATIONS

This application corresponds to international patent application serial no. PCT/US2012/069402, filed 13 Dec. 2012, which claims benefit to provisional patent application Ser. No. 61/569,870, filed 13 Dec. 2011, which is incorporated by reference in their entirety.

This application is also related to the following nine (9) PCT applications, which are all concurrently filed on 25 May 2012, which all claim the benefit of the aforementioned U.S. Provisional Patent Application No. 61/489,893, filed 25 May 2011, and the aforementioned U.S. Provisional Patent Application No. 61/533,544, filed 12 Sep. 2011, and which are all incorporated by reference in their entirety so as to include the subject matter of each other, as follows:

- PCT application no. PCT/US12/39528, entitled "Flotation separation using lightweight synthetic bubbles and beads;"
- PCT application no. PCT/US12/39534, entitled "Mineral separation using functionalized polymer membranes;"
- PCT application no. PCT/US12/39540, entitled "Mineral separation using sized, weighted and magnetized beads;"
- PCT application no. PCT/US12/39576, entitled "Synthetic bubbles/beads functionalized with molecules for attracting or attaching to mineral particles of interest;"
- PCT application no. PCT/US12/39591, entitled "Method and system for releasing mineral from synthetic bubbles and beads;"
- PCT application no. PCT/US12/39596, entitled "Synthetic bubbles and beads having hydrophobic surface;"
- PCT application no. PCT/US12/39631, entitled "Mineral separation using functionalized filters and members;"
- PCT application no. PCT/US12/39655, entitled "Mineral recovery in tailings using functionalized polymers;" and
- PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the bubble surface area flux in the collection zone of the cell. The bubble surface area flux is dependent on the size of the bubbles and the air injection rate. Controlling the bubble surface area flux has traditionally been very difficult. This is a multivariable control problem and there are no dependable real time feedback mechanisms to use for control.

The mineral recovery of such a process can be highly dependent on the mineral particle size distribution entering the flotation cell. Typically, coarse and fine particles recovery can be significantly less than the optimal particle size. Mining operations routinely discharge large well liberated particles to the tailings pond.

The assignee of the present application has designed a new machine and process for recovering valuable minerals from mineral rich pulp slurry. This slurry could be any type of slurry being air conveyed ground minerals or an aqueous mixture for example. This mineral rich slurry is put into contact with a functionalized polymer surface which has been engineered to attract the mineral of interest. The surface could be anything from an engineered bubble to a flat plate. The unwanted material is washed away and only the desirable mineral is left on the surface. The enriched surface is then treated so that the mineral is released and collected. The polymer surface can then be reused.

One of the design challenges is to design a surface that has maximum surface area and yet will survive in an industrial environment. Therefore it must be strong, wear resistant, and be able to pass large amount of rejected solids while capturing the value material.

There is a need in the industry to provide a better way to separate valuable material from unwanted material, e.g., including in such a flotation cell, so as to eliminate problems associated with using air bubbles in such a separation process.

SUMMARY OF THE INVENTION

The Basic Filtration Apparatus

According to some embodiments of the present invention, the present invention may provide mineral separation or filtration techniques based at least partly on using apparatus featuring a collection area comprising collection surfaces configured to contact with a mixture comprising water and valuable material, the valuable material comprising a plurality of mineral particles; and a polymer or the polymer-coated material provided at least on the collection surfaces, the polymer or the polymer-coated material comprises plurality of molecules comprising a functional group configured to attract the mineral particles to the collection surfaces.

According to some embodiments of the present invention, the functional group may include a chemical functional group for bonding the mineral particles to the molecules.

According to some embodiments of the present invention, the functional group may include an ionic group which is either anionic or cationic, including where the functional group includes one or more ions in carboxylic, sulfates, sulfonates, xanthates, dithiophosphates, thionocarboamates, thioureas, xanthogens, monothiophosphates, hydroquinones and polyamines. The list is not necessarily exhaustive.

According to some embodiments of the present invention, the polymer may be selected from a group consisting of polyamides, polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, and polydimethylsiloxane. The list is not necessarily exhaustive.

According to some embodiments of the present invention, the functional group may be configured to render the collection surfaces hydrophobic, including but not limited to where the polymer may be selected from a group consisting of polystyrene, poly(d,l-lactide), poly(dimethylsiloxane), polypropylene, polyacrylic, polyethylene, hydrophobically-modified ethyl hydroxyethyl cellulose polysiloxanates, alkylsilane and fluoroalkylsilane, or including where the mineral particles may include one or more hydrophobic molecular segments attached thereon.

According to some embodiments of the present invention, the polymer may include a siloxane derivative, or polysiloxanates, or hydroxyl-terminated polydimethylsiloxanes.

According to some embodiments of the present invention, the mixture may further include a plurality of collector molecules, and each of the collector molecules may include a hydrophobic molecular segment and an ionized group bonding to the mineral particle.

According to some embodiments, the present invention may take the form of a method featuring providing a collection area on a filter member, the collection area comprising collection surfaces configured to contact with a mixture comprising water and valuable material, the valuable material comprising a plurality of mineral particles; and providing a polymer or the polymer-coated material at least on the collection surfaces, the polymer or the polymer-coated material comprising a plurality of molecules comprising a functional group configured to bind the mineral particles to the collection surfaces.

According to some embodiments of the present invention, the method may also include one or more of the other features set forth herein.

Techniques Using Functionalized Membranes

According to some embodiments, the present invention may be configured to provide mineral separation or filtration techniques using functionalized membranes.

By way of example, the present invention may consist of a new machine and process for recovering valuable materials or minerals from mineral rich pulp slurry. This slurry could be any type of slurry being air conveyed ground minerals or an aqueous mixture for example. This mineral rich slurry may be put into contact with a functionalized polymer surface which has been engineered to attract the mineral of interest. The functionalized polymer surface may take the form of a synthetic bubble or bead, consistent with that set forth in patent application serial no. PCT/US12/39528, filed 25 May 2012, claiming benefit to the aforementioned U.S. Provisional Patent Application No. 61/489,893, as well as a membrane or membrane structure that may take the form of an impeller, a conveyor belt, a filter assembly, or a flat plate, consistent with that set forth in the aforementioned U.S. Provisional Patent Application No. 61/533,544.

The unwanted material may be washed away and only the desirable material or mineral is left on the functionalized polymer surface, or the membrane structure containing the functionalized polymer surface may be separated from the unwanted material. Such separation can take place via techniques related to flotation, size separation, gravimetric separation, and/or magnetic separation. The enriched surface is then treated so that the mineral is released and collected. The polymer surface can then be reused.

According to some embodiments of the present invention, the machine or apparatus will be configured with two chambers, tanks, cells or columns. One chamber, tank, cell or column has an environment conducive to attachment of a valuable material or mineral or particle of interest and the other chamber, tank, cell or column has an environment conducive for release of the valuable material or mineral or particle of interest. An impeller may be coated with a functionalized polymer and configured to rotate slowly inside the two chambers, tanks, cells or columns. As an impeller blade moves into an attachment zone in the one chamber, tank, cell or column, it collects the valuable material or mineral or particle of interest. As the enriched blade moves to a release zone in the other chamber, tank, cell or column, the valuable material or mineral or particle of interest are released.

According to some embodiments of the present invention, a functionalized polymer conveyor belt may be configured to run between the two chambers, tanks, cells or columns, whereby it collects and releases the valuable material or mineral or particle of interest.

According to some embodiments of the present invention, a functionalized polymer collection filter may be placed into each chamber, tank, cell or column to collect and release the valuable material or mineral or particle of interest. This is a batch type process.

Embodiment of Mineral Separation Apparatus

According to some embodiments, the present invention may take the form of a machine, system or apparatus featuring a first processor and a second processor. The first processor may be configured to receive a mixture of fluid, valuable material and unwanted material and a functionalized polymer or polymer-coated member configured to attach to the valuable material in an attachment rich environment, and provide an enriched functionalized polymer or polymer-coated member having the valuable material attached thereto. The second processor may be configured to receive a fluid and the enriched functionalized polymer or polymer-coated member in a release rich environment to release the valuable material, and provide the valuable material released from the enriched functionalized polymer or polymer-coated member to the release rich environment.

The apparatus may be configured to include one or more of the following features:

The first processor may take the form of a first chamber, tank, cell or column, and the second processor may take the form of a second chamber, tank, cell or column.

The first chamber, tank or column may be configured to receive a pulp slurry having water, the valuable material and the unwanted material in the attachment rich environment, which has a high pH, conducive to attachment of the valuable material.

The second chamber, tank or column may be configured to receive water in the release rich environment, which may have a low pH or receive ultrasonic waves conducive to release of the valuable material.

The functionalized polymer or polymer-coated member may take the form of a functionalized polymer or polymer-coated impeller having at least one impeller blade configured to rotate slowly inside the first processor and the second processor. The first processor may be configured to receive the at least one impeller blade in an attachment zone, and provide at least one enriched impeller blade having the valuable material attached thereto in the attachment zone. The second processor may be configured to receive the at least one enriched impeller blade in a release zone and to provide the valuable material released from the at least one enriched impeller blade. The first processor may be configured with a first transition zone to provide drainage of tailings, and the second processor may be configured with a second transition zone to provide drainage of concentrate.

The functionalized polymer or polymer-coated member may take the form of a functionalized polymer or polymer-coated conveyor belt configured to run between the first processor and the second processor. The first processor may be configured to receive the functionalized polymer or polymer-coated conveyor belt and provide an enriched functionalized polymer or polymer-coated conveyor belt having the valuable material attached thereto. The second processor may be configured to receive the enriched functionalized polymer or polymer-coated conveyor belt and provide the valuable material released from the enriched functionalized polymer or polymer-coated conveyor belt. The functionalized polymer or polymer-coated conveyor belt may be made of a mesh material.

The functionalized polymer or polymer-coated member may take the form of a functionalized polymer or polymer-coated collection filter configured to move between the first processor and the second processor as part of a batch type process. The first processor may be configured to receive the functionalized polymer or polymer-coated collection filter and to provide an enriched functionalized polymer or polymer-coated collection filter having the valuable material attached thereto. The second processor device may be configured to receive the enriched functionalized polymer or polymer-coated collection filter and provide the valuable material released from the enriched functionalized polymer or polymer-coated collection filter.

The first processor may be configured to provide tailings containing the unwanted material, and the second processor may be configured to provide a concentrate containing the valuable material.

The functionalized polymer or polymer-coated member may take the form of a membrane or a thin soft pliable sheet or layer.

According to some embodiment, the present invention may also take the form of apparatus featuring first means that may be configured to receive a mixture of fluid, valuable material and unwanted material and a functionalized polymer or polymer-coated member configured to attach to the valuable material in an attachment rich environment, and provide an enriched functionalized polymer or polymer-coated member having the valuable material attached thereto; and second means that may be configured to receive a fluid and the enriched functionalized polymer or polymer-coated member in a release rich environment to release the valuable material, and provide the valuable material released from the enriched functionalized polymer or polymer-coated member to the release rich environment.

According to some embodiments of the present invention, the first means may be configured to receive a pulp slurry having water, the valuable material and the unwanted material in the attachment rich environment, which has a high pH, conducive to attachment of the valuable material; and the second means may be configured to receive water in the release rich environment, which has a low pH or receives ultrasonic waves conducive to release of the valuable material.

According to some embodiments of the present invention, the functionalized polymer or polymer-coated member may take the form of one of the following:

a functionalized polymer or polymer-coated impeller having at least one impeller blade configured to rotate slowly inside the first means and the second means;

a functionalized polymer or polymer-coated conveyor belt configured to run between the first means and the second means; or a functionalized polymer or polymer-coated collection filter configured to move between the first means and the second means as part of a batch type process.

Embodiments of Mineral Separation Processes or Methods

According to some embodiment, the present invention may also take the form of a process or method featuring receiving in a first processor a mixture of fluid, valuable material and unwanted material and a functionalized polymer or polymer-coated member configured to attach to the valuable material in an attachment rich environment, and providing from the first processor an enriched functionalized polymer or polymer-coated member having the valuable material attached thereto; and receiving in a second processor a fluid and the enriched functionalized polymer or polymer-coated member in a release rich environment to release the valuable material, and providing the valuable material released from the enriched functionalized polymer or polymer-coated member to the release rich environment.

Polymer or Polymer-Coated Surface

The invention describes the embodiment of a polymer or polymer-coated surface that meets all the challenges as described above. This is in the form of a cord, string, or rope that is of various cross section diameter and geometries. This cord is made of very strong materials such as, but not limited to, Kevlar. The cord is then coated with the functionalized polymer and used to fabricate a filtering surface. The cords may be introduced individually to the flow stream or as a mesh. As individual cords they will collect the valuable mineral and still be flexible enough to survive impacts due to contamination in the flow stream. The cords may be individually replaced if damaged. As a mesh the surface will have large surface area as well as be flexible and strong.

According to some embodiments of the present invention, the method may include being implemented consistent with one or more of the features set forth herein.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 1 includes FIG. 1a is a side partial cutaway view in diagram form of a separation processor configured with two chambers, tanks or columns having a functionalized polymer or polymer-coated impeller arranged therein according to some embodiments of the present invention, and includes FIG. 1b is a top partial cross-sectional view in diagram form of a functionalized polymer or polymer-coated impeller moving in an attachment rich environment contained in an attachment chamber, tank or column and also moving in a release rich environment contained in a release chamber, tank or column according to some embodiments of the present invention.

FIG. 9a illustrates a plurality of functional groups attached to surfaces for attracting mineral particles, according to some embodiments of the present invention.

FIG. 9b illustrates a plurality of hydrophobic molecules attached to surfaces for attracting mineral particles, according to some embodiments of the present invention.

FIG. 9c illustrates a plurality of hydrophobic molecules attached to surfaces for attracting non-mineral particles, according to some embodiments of the present invention.

FIG. 11 is a diagram showing a filter placed in a tailings pond to collect valuable material according to some embodiments of the present invention.

DETAILED DESCRIPTION OF THE INVENTION

FIGS. 1, 1a, 1b

Figure 2:
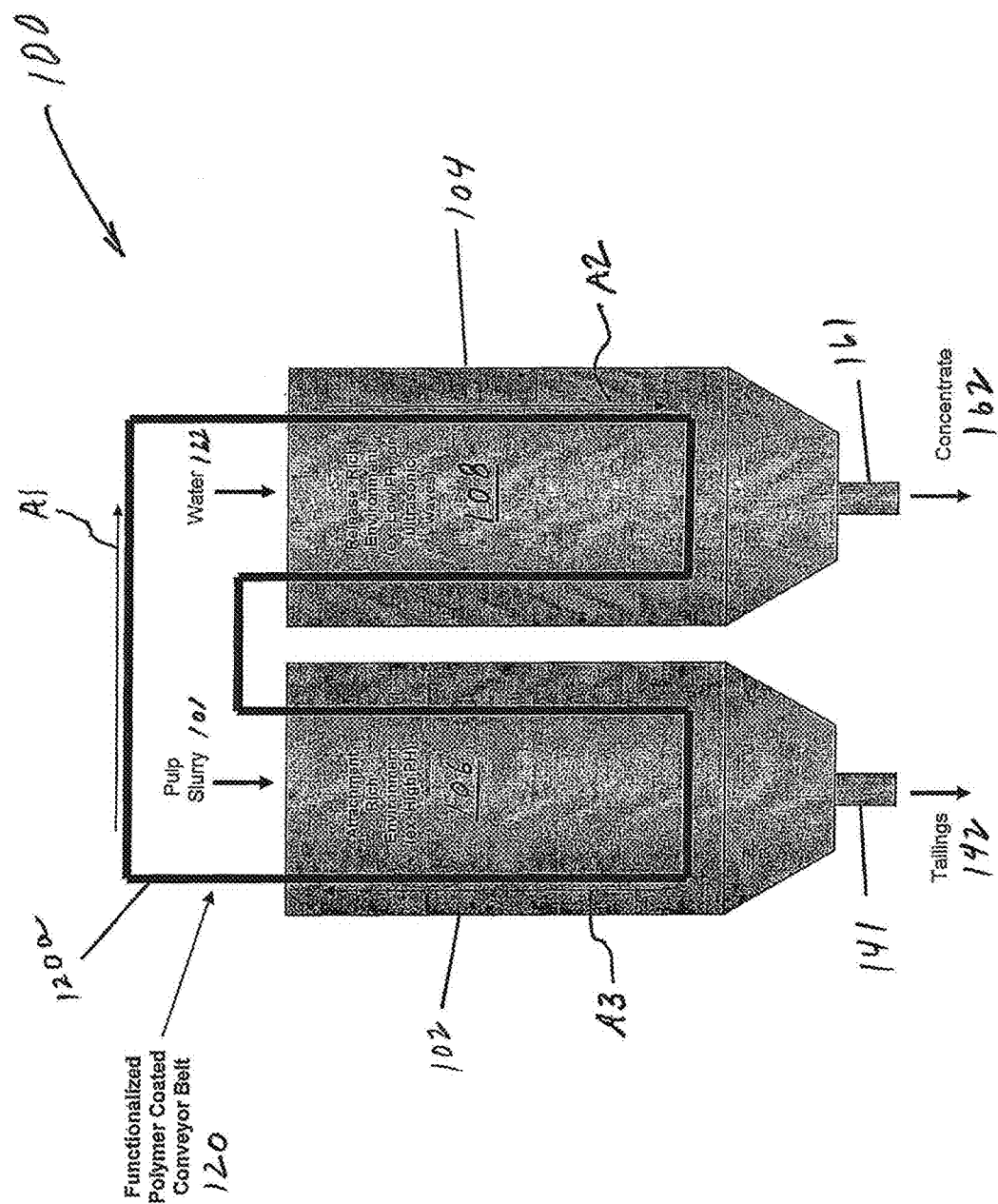
FIG. 2 is diagram of a separation processor configured with two chambers, tanks or columns having a functionalized polymer or polymer-coated conveyor belt arranged therein according to some embodiments of the present invention.

By way of example, FIG. 1 shows the present invention is the form of a machine, device, system or apparatus 10, e.g., for separating valuable material from unwanted material in a mixture 11, such as a pulp slurry, using a first processor 12 and a second processor 14. The first processor 12 and the second processor 14 are configured with a functionalized polymer or polymer-coated member that is shown, e.g., as a functionalized polymer or polymer-coated impeller 20 (FIG. 1a), 20' (FIG. 1b), according to some embodiments of the present invention. In operation, the impeller 20, 20' slowly rotates in relation to the first processor 12 and the second processor 14, the impeller blades slowly pass through the attachment rich environment 16 in the first processor 12 where the valuable material is attached to the blades and through the release rich environment 18 in the second processor 14 is released from the blades. By way of example, the polymer or polymer-coated impeller 20 is shown rotating in a counterclockwise direction as indicated by arrow a, although the scope of the invention is not intended to be limited to the direction of the impeller rotation, or the manner in which the functionalized polymer or polymer-coated impeller 20 (FIG. 1a), 20' (FIG. 1b) is arranged, mounted, or configured in relation to the first processor 12 and the second processor 14.

The first processor 12 may take the form of a first chamber, tank, cell or column that contains an attachment rich environment generally indicated as 16. The first chamber, tank or column 12 may be configured to receive via piping 13 the mixture or pulp slurry 11 in the form of fluid (e.g., water), the valuable material and the unwanted material in the attachment rich environment 16, e.g., which has a high pH, conducive to attachment of the valuable material. The second processor 14 may take the form of a second chamber, tank, cell or column that contains a release rich environment generally indicated as 18. The second chamber, tank, cell or column 14 may be configured to receive via piping 15, e.g., water 22 in the release rich environment 18, e.g., which may have a low pH or receive ultrasonic waves conducive to release of the valuable material. Attachment rich environments like that forming part of element environment 16 conducive to the attachment of a valuable material of interest and release rich environments like that forming part of environment 18 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 16 and a corresponding release rich environment like environment 18 based on the separation technology disclosed herein for any particular valuable mineral of interest, e.g., copper, forming part of any particular mixture or slurry pulp.

In operation, the first processor 12 may be configured to receive the mixture or pulp slurry 11 of water, valuable material and unwanted material and the functionalized polymer or polymer-coated member that is configured to attach to the valuable material in the attachment rich environment 16. In FIG. 1, the functionalized polymer or polymer-coated member is shown as the functionalized polymer or polymer-coated impeller 20 (FIG. 1a), 20' (FIG. 1b). In FIG. 1a, the functionalized polymer or polymer-coated impeller 20 has a shaft 21 and at least one impeller blade 20a, 20b, 20c, 20d, 2e, 20f, 20g and is configured to rotate slowly inside the first processor 12 and the second processor 14. In FIG. 1b, the functionalized polymer or polymer-coated impeller 20' has a shaft 21' and impeller blades 20a, 20b', 20c', 20d', 2e', 20f', 20g' and 20h'. Each impeller blade in FIG. 1 is understood to be configured and functionalized with a polymer coating to attach to the valuable material in the attachment rich environment 16. (The scope of the invention is not intended to be limited to the number of blades on the impeller 20, 20' and the embodiment in FIGS. 1a and 1b is shown with impellers 21, 21' having a different number of blades.)

In FIG. 1, the first processor 12 is configured to receive at least one impeller blade of the functionalized polymer or polymer-coated impeller 20 (FIG. 1a), 20' (FIG. 1b). In FIG. 1b, the at least one impeller blade is shown as impeller blade 20g' being received in an attachment zone 30 that forms part of the attachment rich environment 16 defined by walls 30a, 30b. The first processor 12 may also be configured with a first transition zone generally indicated as 40 to provide drainage from piping 41 of, e.g., tailings 42 as shown in FIG. 1a.

The first processor 12 may also be configured to provide at least one enriched impeller blade having the valuable material attached thereto, after passing through the attachment rich environment 16. In FIG. 1b, the at least one enriched impeller blade is shown as the at least one enriched impeller blade 20c' being provisioned from the attachment rich environment 16 in the first processor 12 to the release rich environment 18 in the second processor 14.

The second processor 14 may be configured to receive via the piping 15 the fluid 22 (e.g. water) and the enriched functionalized polymer or polymer-coated member to release the valuable material in the release rich environment 18. In FIG. 1b, the second processor 14 is shown receiving the enriched impeller blade 20c' in a release zone 50, e.g., that forms part of the release rich environment 18 and is defined, e.g., by walls 30c and 30d.

The second processor 14 may also be configured to provide the valuable material that is released from the enriched functionalized polymer or polymer-coated member into the release rich environment 18. For example, in FIG. 1b the second processor 14 is shown configured with a second transition zone 60 defined by walls 30a and 30d to provide via piping 61 drainage of the valuable material in the form of a concentrate 62 (FIG. 1a).

FIG. 2

The Functionalized Polymer or Polymer-Coated Conveyor Belt

By way of example, FIG. 2 shows the present invention is the form of a machine, device, system or apparatus 100, e.g., for separating valuable material from unwanted material in a mixture 101, such as a pulp slurry, using a first processor 102 and a second processor 104. The first processor 102 and the second processor 104 are configured with a functionalized polymer-coated member that is shown, e.g., as a functionalized polymer or polymer-coated conveyor belt 120 that runs between the first processor 102 and the second processor 104, according to some embodiments of the present invention. The arrows A1, A2, A3 indicate the movement of the functionalized polymer or polymer-coated conveyor belt 120. Techniques, including motors, gearing, etc., for running a conveyor belt like element 120 between two processors like elements 102 and 104 are known in the art, and the scope of the invention is not intended to be limited to any particular type or kind thereof either now know or later developed in the future. According to some embodiments of the present invention, the functionalized polymer or polymer-coated conveyor belt 120 may be made of a mesh material.

The first processor 102 may take the form of a first chamber, tank, cell or column that contains an attachment rich environment generally indicated as 106. The first chamber, tank or column 102 may be configured to receive the mixture or pulp slurry 101 in the form of fluid (e.g., water), the valuable material and the unwanted material in the attachment rich environment 106, e.g., which has a high pH, conducive to attachment of the valuable material. The second processor 104 may take the form of a second chamber, tank, cell or column that contains a release rich environment generally indicated as 108. The second chamber, tank, cell or column 104 may be configured to receive, e.g., water 122 in the release rich environment 108, e.g., which may have a low pH or receive ultrasonic waves conducive to release of the valuable material. Consistent with that stated above, attachment rich environments like that forming part of element environment 106 conducive to the attachment of a valuable material of interest and release rich environments like that forming part of environment 108 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 106 and a corresponding release rich environment like environment 108 based on the separation technology disclosed herein for any particular valuable mineral of interest, e.g., copper, forming part of any particular mixture or slurry pulp.

In operation, the first processor 102 may be configured to receive the mixture or pulp slurry 101 of water, valuable material and unwanted material and the functionalized polymer or polymer-coated conveyor belt 120 that is configured to attach to the valuable material in the attachment rich environment 106. In FIG. 2, the conveyor belt 120 is understood to be configured and functionalized with a polymer coating to attach to the valuable material in the attachment rich environment 106.

The first processor 102 may also be configured to provide drainage from piping 141 of, e.g., tailings 142 as shown in FIG. 2.

The first processor 102 may also be configured to provide an enriched functionalized polymer or polymer-coated conveyor belt having the valuable material attached thereto, after passing through the attachment rich environment 106. In FIG. 2, the enriched functionalized polymer-coated conveyor belt is shown, e.g., as that portion or part 120a of the conveyor belt 120 being provisioned from the attachment rich environment 106 in the first processor 102 to the release rich environment 108 in the second processor 104. It is understood that some other portions or parts of the belt 120 may be enriched, including the portion or part immediately leaving the attachment rich environment 106, as well as the portion or part immediately entering the release rich environment 108.

The second processor 14 may be configured to receive the fluid 122 (e.g. water) and the portion 120a of the enriched functionalized polymer or polymer-coated conveyor belt 120 to release the valuable material in the release rich environment 108.

The second processor 104 may also be configured to provide the valuable material that is released from the enriched functionalized polymer-coated member into the release rich environment 108. For example, in FIG. 2 the second processor 104 is shown configured to provide via piping 161 drainage of the valuable material in the form of a concentrate 162.

In FIG. 2, the first processor 102 is configured with the functionalized polymer-coated conveyor belt 120 passing through with only two turns inside the attachment rich environment 106. However, embodiments are envisioned in which the first processor 102 may be configured to process the functionalized polymer or polymer-coated conveyor belt 120 using a serpentine technique for winding or turning the conveyor belt 120 one way and another way, back and forth, inside the first processor to maximize surface area of the belt inside the processor 102 and exposure of the conveyor belt 120 to the attachment rich environment 106.

FIG. 3

The Functionalized Polymer or Polymer-Coated Filter

Figure 3:
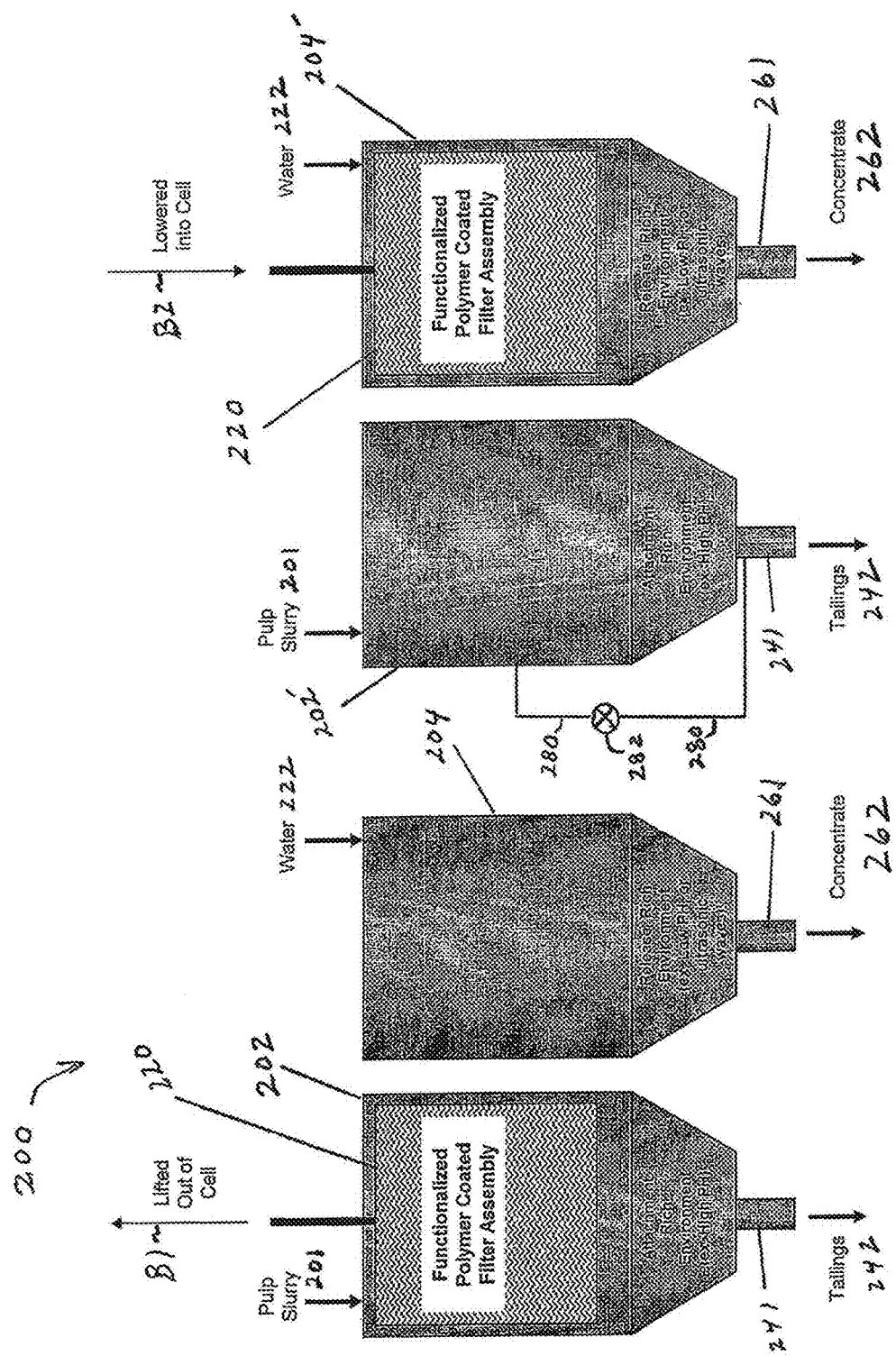
FIG. 3 is diagram of a separation processor configured with a functionalized polymer or polymer-coated filter assembly for moving between two chambers, tanks or columns in a semi-continuous batch process according to some embodiments of the present invention.

By way of example, FIG. 3 shows the present invention is the form of a machine, device, system or apparatus 200, e.g., for separating valuable material from unwanted material in a mixture 201, such as a pulp slurry, using a first processor 202, 202' and a second processor 204, 204'. The first processor 202 and the second processor 204 are configured to process a functionalized polymer or polymer-coated member that is shown, e.g., as a functionalized polymer or polymer-coated collection filter 220 configured to be moved between the first processor 202 and the second processor 204' as shown in FIG. 3 as part of a batch type process, according to some embodiments of the present invention. In FIG. 3, by way of example the batch type process is shown as having two first processor 202, 202' and second processor 204, 204, although the scope of the invention is not intended to be limited to the number of first or second processors. Moreover, embodiments are envisioned using a different number of first and second processor, different types or kinds of processors, as well as different types or kinds of processors both now known or later developed in the future. According to some embodiments of the present invention, the functionalized polymer or polymer-coated collection filter 220 may take the form of a membrane or a thin soft pliable sheet or layer. The filter 220 may be made of a cord, string or rope that may have various cross section and geometries. The arrow B1 indicates the movement of the functionalized polymer or polymer-coated filter 220 from the first processor 202, and the arrow B2 indicates the movement of the functionalized polymer or polymer-coated collection filter 220 into the second processor 202. Techniques, including motors, gearing, etc., for moving a filter like element 220 from one processor to another processor like elements 202 and 204 are known in the art, and the scope of the invention is not intended to be limited to any particular type or kind thereof either now know or later developed in the future.

The first processor 202 may take the form of a first chamber, tank, cell or column that contains an attachment rich environment generally indicated as 206. The first chamber, tank or column 102 may be configured to receive the mixture or pulp slurry 201 in the form of fluid (e.g., water), the valuable material and the unwanted material in the attachment rich environment 206, e.g., which has a high pH, conducive to attachment of the valuable material. The second processor 204 may take the form of a second chamber, tank, cell or column that contains a release rich environment generally indicated as 208. The second chamber, tank, cell or column 204 may be configured to receive, e.g., water 222 in the release rich environment 208, e.g., which may have a low pH or receive ultrasonic waves conducive to release of the valuable material. Consistent with that stated above, attachment rich environments like that forming part of element environment 206 conducive to the attachment of a valuable material of interest and release rich environments like that forming part of environment 208 conducive to the release of the valuable material of interest are known in the art, and the scope of the invention is not intended to be limited to any particular type or kind thereof either now known or later developed in the future. Moreover, a person skilled in the art would be able to formulate an attachment rich environment like environment 206 and a corresponding release rich environment like environment 208 based on the separation technology disclosed herein for any particular valuable mineral of interest, e.g., copper, forming part of any particular mixture or slurry pulp.

In operation, the first processor 202 may be configured to receive the mixture or pulp slurry 101 of water, valuable material and unwanted material and the functionalized polymer or polymer-coated collection filter 220 that is configured to attach to the valuable material in the attachment rich environment 206. In FIG. 3, the functionalized polymer or polymer-coated collection filter 220 is understood to be configured and functionalized with a polymer coating to attach to the valuable material in the attachment rich environment 106.

The first processor 202 may also be configured to provide drainage from piping 241 of, e.g., tailings 242 as shown in FIG. 3.

The first processor 202 may also be configured to provide an enriched functionalized polymer or polymer-coated collection filter having the valuable material attached thereto, after soaking in the attachment rich environment 106. In FIG. 3, the enriched functionalized polymer or polymer-coated collection filter 220 is shown, e.g., being provisioned from the attachment rich environment 206 in the first processor 202 to the release rich environment 208 in the second processor 204.

The second processor 204 may be configured to receive the fluid 222 (e.g. water) and the enriched functionalized polymer or polymer-coated collection filter 220 to release the valuable material in the release rich environment 208.

The second processor 204 may also be configured to provide the valuable material that is released from the enriched functionalized polymer or polymer-coated collection filter 220 into the release rich environment 208. For example, in FIG. 3 the second processor 204 is shown configured to provide via piping 261 drainage of the valuable material in the form of a concentrate 262.

The first processor 202' may also be configured with piping 280 and pumping 280 to recirculate the tailings 242 back into the first processor 202'. The scope of the invention is also intended to include the second processor 204' being configured with corresponding piping and pumping to recirculate the concentrate 262 back into the second processor 204'. Similar recirculation techniques may be implemented for the embodiments disclosed in relation to FIGS. 1-2 above.

The scope of the invention is not intended to be limited to the type or kind of batch process being implemented. For example, embodiments are envisioned in which the batch process may include the first and second processors 202, 204 being configured to process the enriched functionalized polymer-coated collection filter 220 in relation to one type or kind of valuable material, and the first and second processors 202', 204' being configured to process the enriched functionalized polymer-coated collection filter 220 in relation to either the same type or kind of valuable material, or a different type or kind of valuable material. Moreover, the scope of the invention is intended to include batch processes both now known and later developed in the future.

Figure 4:
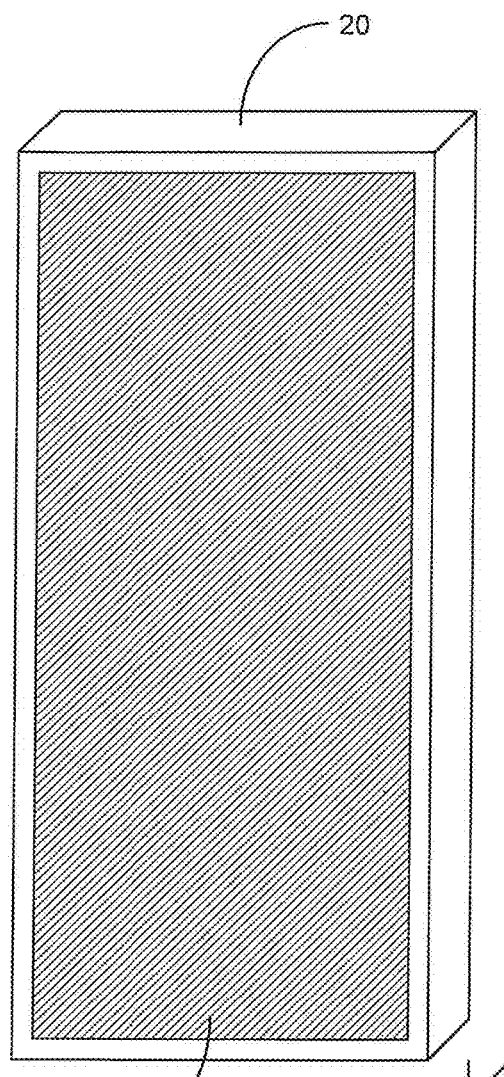
FIG. 4 is an illustration of an impeller according to some embodiments of the present invention.
Figure 5:
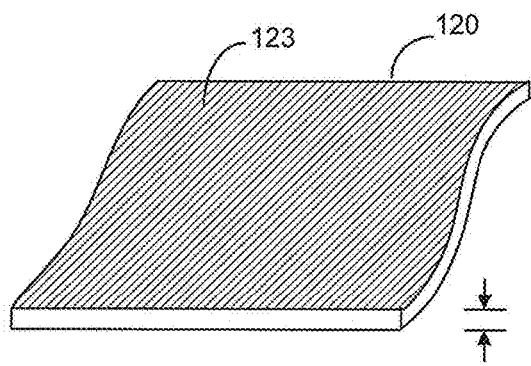
FIG. 5 is an illustration of a section of a conveyor belt according to some embodiments of the present invention.
Figure 6:
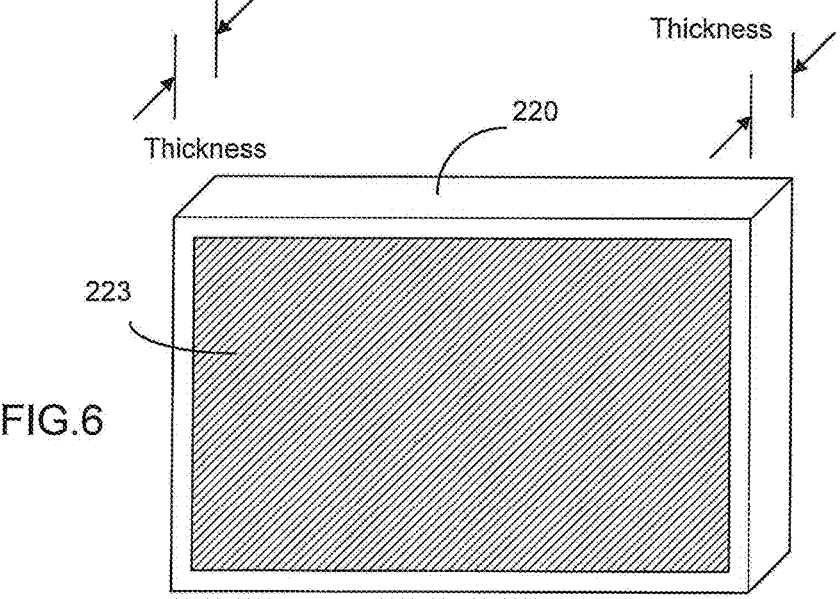
FIG. 6 is an illustration of a filter according to some embodiments of the present invention.

In order to further clarify the term "functionalized polymer" as applied to the polymer or polymer-coated impeller 20 (FIG. 1*a*), the coated conveyor belt 120 (FIG. 2) and the collection filter 220 (FIG. 3), various surfaces to be coated are illustrated in FIGS. 4-6. The various physical structures of the surfaces to be coated are illustrated in FIGS. 7*a*-7*f*, and some embodiments of the functionalized polymer are depicted in FIGS. 8*a*, 8*b*, 8*c*, 9*a*, 9*b* and 9*c*.

By way of example, the polymer, according to some embodiments of the present invention, at least can be functionalized to attract particles in two different ways.

Figure 8C:
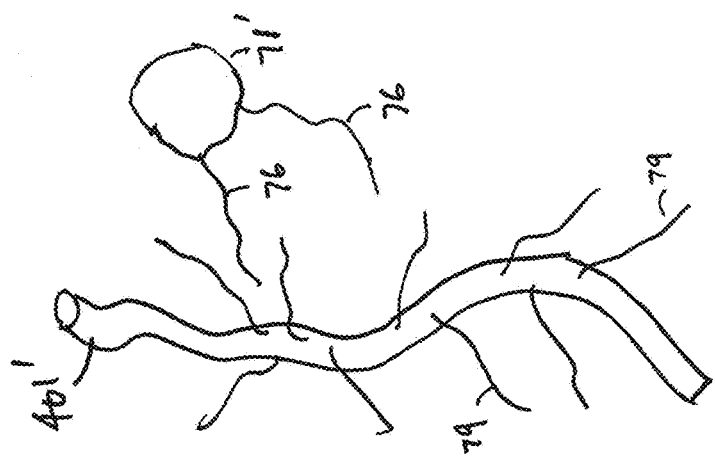
FIG. 8c illustrates a plurality of hydrophobic molecules attached to a fiber for attracting non-mineral particles according to some embodiments of the present invention.

1. The polymer surface has a plurality of molecules 73 (FIGS. 8*a*, 9*a*) having a functional group 78 (FIGS. 8*a*, 8*b*) to attract mineral particles 72 (FIGS. 8*a*, 9*a*).

2. The polymer surface has a plurality of molecules 79 (FIGS. 8*b*, 9*b*, 9*c*, 9*d*) rendering the surface hydrophobic in order to attract mineral particles 71, 71' (FIGS. 8*b*, 9*b*, 9*c*, 9*d*).

Polymer Surface Having Functional Groups

The term "polymer" in this disclosure means a large molecule made of many units of the same or similar structure linked together. In some embodiments of the present invention, the polymer surface on a filter has a plurality of molecules 73 (FIGS. 8*a*, 9*a*) having a functional group 78 (FIGS. 8*a*, 8*b*) to attract mineral particles 72 (FIGS. 8*a*, 9*a*). In these embodiments, the unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. Thus, the polymer or the polymer-coated material can be hard or rigid like plastic or soft and flexible like an elastomer. While the physical properties of the filter can vary, the surface of the filter is chemically functionalized to provide a plurality of functional groups to attract mineral particles. The terms "valuable material" and "mineral particle" are used herein interchangeably. It is possible to use a molecule or molecular segment 76 (FIG. 8*a*, 9*a*) to attach a functional group 78 to the polymer surface. In general, the molecule 76 can be a hydrocarbon chain, for example, and the functional group 78 can be ionic for attracting a mineral, such as copper to the surface 74. A xanthate, for example, has both the functional group 78 and the molecular segment 76 to be incorporated into the polymer that is used to make or coat the surface. A functional group 78 is also known as a collector that is either ionic or non-ionic. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. Similarly, a chelating agent can be incorporated into the polymer as a collector site for attaching to a mineral, such as copper. A surface having a functionalized polymer is also referred herein as synthetic surface.

Polymer Having Molecules to Render a Surface Hydrophobic

In some embodiments of the present invention, at least the surface of a filter surface is functionalized so that the surface is hydrophobic. It is possible to functionalize a polymer surface to have a plurality of molecules 79 (FIGS. 8*b*, 8*c*, 9*b*, 9*c*) to render the surface hydrophobic.

In chemistry, hydrophobicity is the physical property of a molecule (known as a hydrophobe) that is repelled from a mass of water. Hydrophobic molecules tend to be non-polar and, thus, prefer other neutral molecules and non-polar solvents. Hydrophobic molecules in water often cluster together. According to thermodynamics, matter seeks to be in a low-energy state, and bonding reduces chemical energy. Water is electrically polarized, and is able to form hydrogen bonds internally, which gives it many of its unique physical properties. But, since hydrophobes are not electrically polarized, and because they are unable to form hydrogen bonds, water repels hydrophobes, in favor of bonding with itself. It is this effect that causes the hydrophobic interaction.

The hydrophobic effect is the observed tendency of non-polar substances to aggregate in aqueous solution and exclude water molecules. It can be observed as the segregation and apparent repulsion between water and non-polar substances. The hydrophobic interaction is mostly an entropic effect originating from the disruption of hydrogen bonds between molecules of liquid water by the non-polar solute. A hydrocarbon chain or a similar non-polar region or a big molecule is incapable of forming hydrogen bonds with water. The introduction of such a non-hydrogen bonding surface into water causes disruption of the hydrogen bonding network between water molecules. By aggregating together, nonpolar molecules reduce the surface area exposed to water and minimize their disruptive effect.

Froth flotation is a process for selectively separating hydrophobic materials from hydrophilic. The process has been adapted and applied to a wide variety of materials to be separated, and additional collector agents, including surfactants and synthetic compounds have been adopted for various applications.

In mining operations, froth flotation is a process for separating minerals from gangue by taking advantage of differences in their hydrophobicity. Hydrophobicity differences between valuable minerals and waste gangue are increased through the use of surfactants and wetting agents. The selective separation of the minerals makes processing complex (that is, mixed) ores economically feasible. The flotation process is used for the separation of a large range of sulfides, carbonates and oxides prior to further refinement. Phosphates and coal are also upgraded (purified) by flotation technology. Froth flotation commences by comminution (that is, crushing and grinding), which is used to increase the surface area of the ore for subsequent processing. The ore include the desired minerals and other unwanted materials, know a gangue. The process of grinding the ore into a fine power is known as liberation. The fine powder ore is then mixed with water to form a slurry. The desired mineral is rendered hydrophobic by the addition of a surfactant or collector chemical. The particular chemical depends on which mineral is being refined. This slurry (more properly called the pulp) of hydrophobic mineral particles and hydrophilic gangue particles is then placed in a flotation column or horizontal pipeline wherein the concentrated mineral is separated from the tailings containing the gangue. To be effective on a given ore slurry, the collectors are chosen based upon their selective wetting of the types of particles to be separated. A good collector will adsorb, physically or chemically, with one of the types of particles. In a flotation circuit for mineral concentration, various flotation reagents are added to a mixture of ore and water (called pulp) in a conditioning tank. The flow rate and tank size are designed to give the minerals enough time to be activated. The conditioner pulp is fed to a bank of rougher cells which remove most of the desired minerals as a concentrate. The rougher pulp passes to a bank of scavenger cells where additional reagents may be added. The scavenger cell froth is usually returned to the rougher cells for additional treatment, but in some cases may be sent to special cleaner cells. The scavenger pulp is usually barren enough to be discarded as tails. More complex flotation circuits have several sets of cleaner and re-cleaner cells, and intermediate re-grinding of pulp or concentrate. Because of a number of other factors, as much as 15% of the liberated minerals are not recovered and are discarded as gangue.

Collectors

Collectors either chemically bond (chemisorption) on a hydrophobic mineral surface, or adsorb onto the surface in the case of, for example, coal flotation through physisorption. Collectors increase the natural hydrophobicity of the surface, increasing the separability of the hydrophobic and hydrophilic particles. The hydrophobic particles of interest, according to the present invention, are depicted as particles 71', 72' in FIGS. 8*b*, 8*c*, 9*b* and 9*c*.

FIGS. 4, 5 and 6

Impellers, Conveyor Belts and Filters

By way of example, the impeller 20 (FIG. 1) has a collection area 23 to support the functionalized polymer (FIG. 4). The conveyor belt 120 (FIG. 2) has a collection area 123 to support the functionalized polymer (FIG. 5). The filter 220 (FIG. 3) has a collection area 223 to support the functional polymer (FIG. 6). The collection area 23, 123 and 223 can take many forms and have various surface features (FIGS. 7*a*-7*f*) to attract the mineral particles of interest, when the impeller 20, conveyor belt 120 and the filter 220 are made contact with a mixture or pulp slurry 11 (FIG. 1), 101 (FIG. 2), 201 (FIG. 3) that includes water and valuable material.

FIGS. 7*a*-7*f*

Surface Features

Figure 7A:
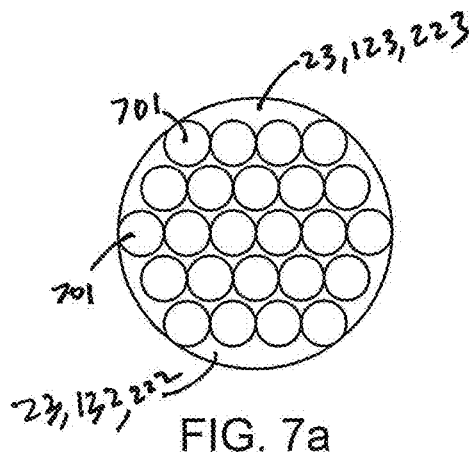
FIGS. 7a-7f illustrates various surface features of the impeller, conveyor belt and filter according to some embodiments of the present invention.
Figure 7B:
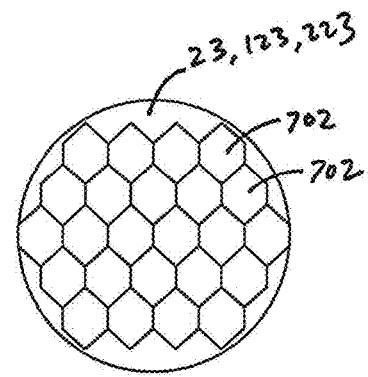
Figure 7C:
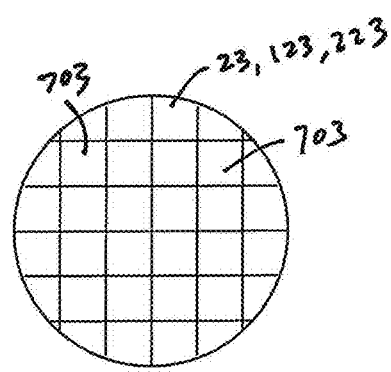
Figure 7D:
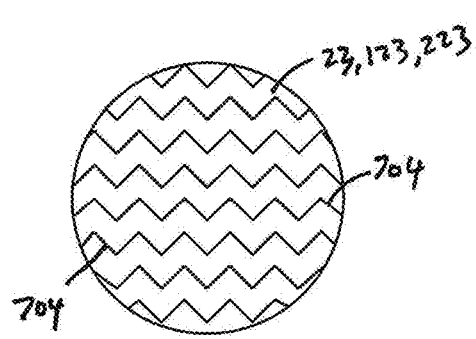
Figure 7E:
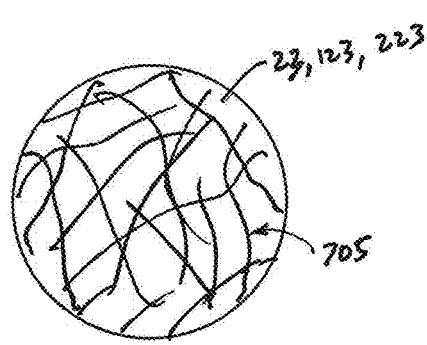
Figure 7F:
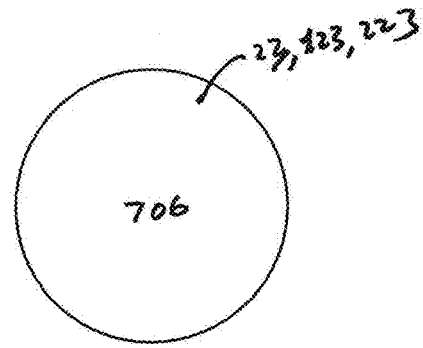
Figure 12B:
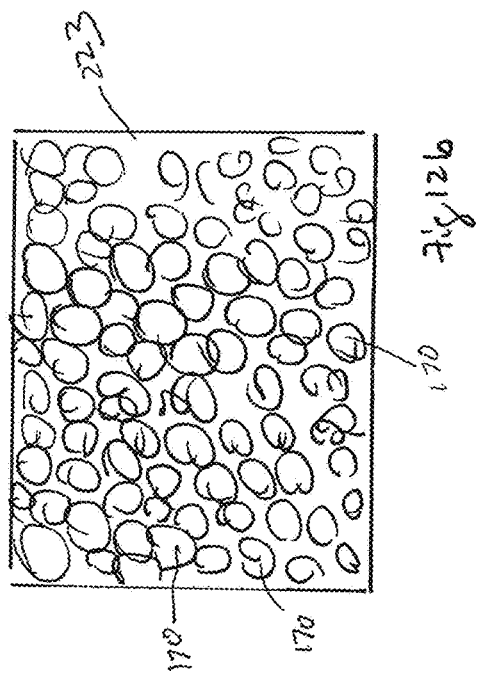
FIG. 12b illustrates a filter using a plurality of synthetic beads or bubbles for collecting valuable material, according to some embodiments of the present invention.
Figure 12C:
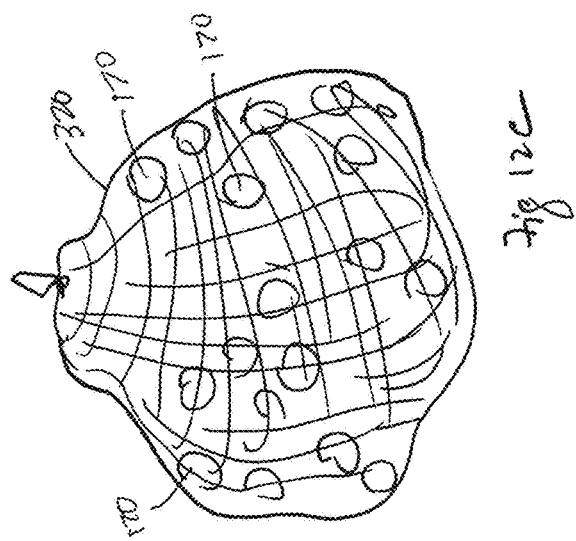
FIG. 12c illustrates a sack of synthetic beads which can be used as a filter to collect valuable material in a tailings pond, for example, according to some embodiments of the present invention.
Figure 12A:
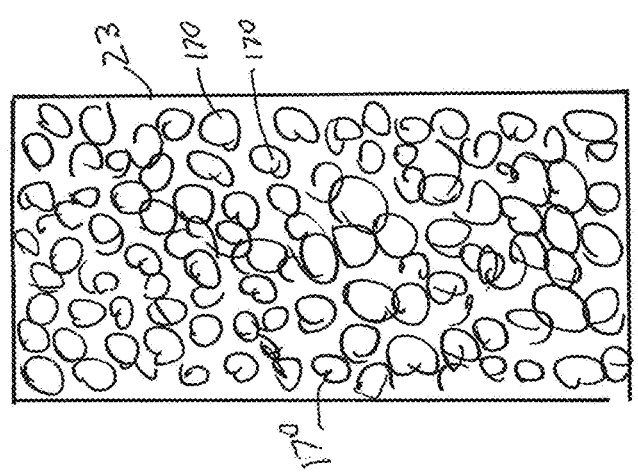
FIG. 12a illustrates an impeller using a plurality of synthetic beads or bubbles for collecting valuable material, according to some embodiments of the present invention.

By way of example, each of the collection areas 23, 123 and 223 (FIGS. 4-6) may have a plurality of openings to allow the pulp slurry 11 (FIG. 1), 101 (FIG. 2), 201 (FIG. 3) to pass through while collecting at least part of the valuable material in the pulp slurry. The surface inside an opening and the surfaces or edges around the opening will be provided with the functional groups to attract the mineral particles. Those surfaces are referred to as collection surfaces. For example, the openings on the collection areas 23, 123 and 223 can take the form of holes or cylindrical passage ways 701 as shown in FIG. 7*a*. The openings on the collection areas 23, 123 and 223 can take the form of hexagonal passage ways 702 arranged like honeycomb, as shown in FIG. 7*b*. The collection areas 23, 123 and 223 can have a rectangular grid 703, as shown in FIG. 7*c*. The collection areas 23, 123 and 223 may comprise a stack of wavy sheets 704*a* shown in FIG. 7*d*. The collection areas 23, 123 and 223 may comprise an irregular arrangement of fiber-like or mesh-like structures 705 as shown in FIG. 7*e*. The collection areas 23, 123 and 223 may comprise a plain surface 706 as shown in FIG. 7*f*. The plain surface 06 may be a smooth surface, a paper-like surface or matted surface, without larger structures. The collection area 23, 123 and 223 can be made of a polymer or the polymer-coated material, such as a polymer functionalized for attracting the mineral particles. Alternatively, only the collection surfaces are coated with such a polymer. In a different embodiment of the present invention, the collection area 223 comprises a panel, such as a glass panel, a ceramic panel and a metal sheet, wherein one or both sides of the panel has a plain surface 706. In yet another embodiment of the present invention, the impeller 20 and the filter 220 comprise a collection of polymer or the polymer-coated bubbles or beads as shown in FIG. 12*a*-12*b*.

FIGS. 8*a*-9*c*

Surface Molecules

Figure 8B:
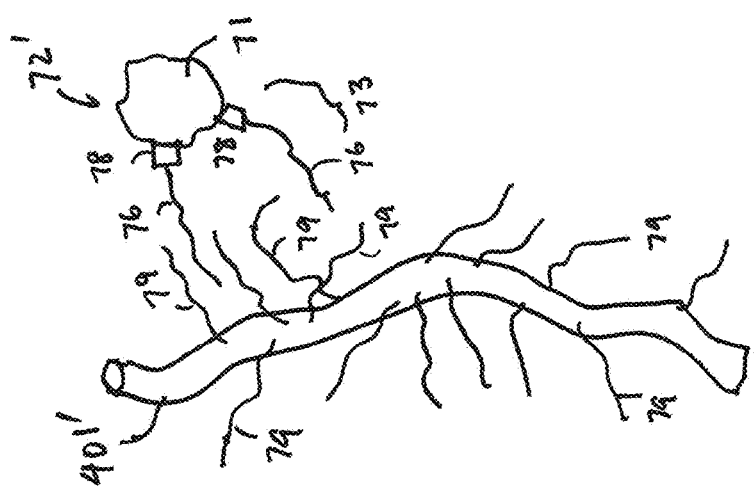
FIG. 8b illustrates a plurality of hydrophobic molecules attached to a fiber for attracting mineral particles, according to some embodiments of the present invention.
Figure 8A:
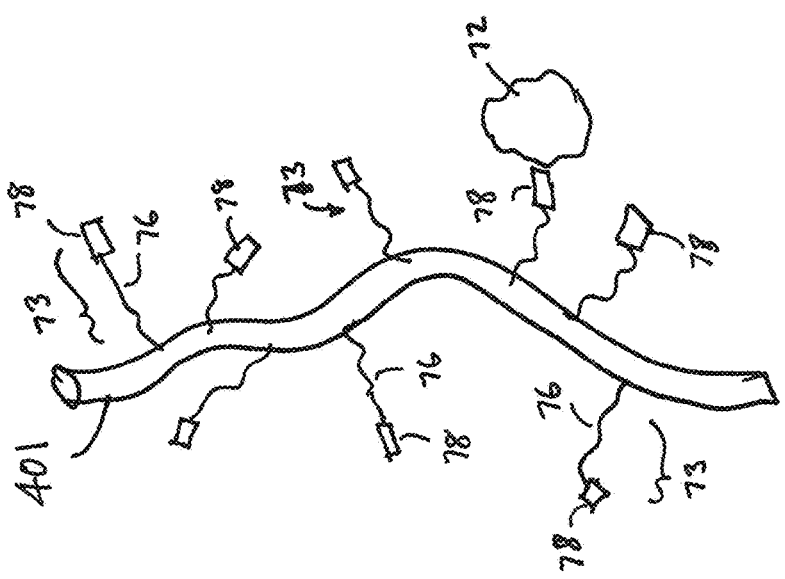
FIG. 8a illustrates a plurality of functional groups attached to a fiber for attracting mineral particles according to some embodiments of the present invention, according to some embodiments of the present invention.

By way of example, the fiber-like structures 705 (FIG. 7*e*) can be functionalized so that they become attached to molecules 73 (FIGS. 8*a*, 8*b*). The fiber-like structures 705 as shown in FIG. 7*e* can be made of individual fibers 401, 401' as shown in FIG. 8*a*-8*c*. By way of example, the individual fibers 401, 401' may be made of a cord, string or rope that may have various cross section and geometries. In one embodiment of the present invention, the fiber 401 (FIG. 8*a*) can be made of a polymer that has a plurality of molecules 73 to provide the functional group 78 and the attaching molecular segment 76. A xanthate, for example, has both the functional group 78 and the molecular segment 76 to be incorporated into the polymer that is used to make the fiber 401. A functional group 78 is also known as a collector that is ionic or non-ionic to attract mineral particles 72. The ion can be anionic or cationic. An anion includes, but not limited to, oxyhydryl, such as carboxylic, sulfates and sulfonates, and sulfhydral, such as xanthates and dithiophosphates. Other molecules or compounds that can be used to provide the function group 78 include thionocarboamates, thioureas, xanthogens, monothiophosphates, hydroquinones and polyamines. In another embodiment of the present invention, the fiber 401 is coated with polymer that has the molecules 73 to provide the functional group 78 and the attaching molecular segment 76. With such a coating, the fiber 401 can be made of glass, ceramic, metal, nylon, cotton or a different polymer. A diagram of the fiber 401 and the attached molecules 73 is shown in FIG. 8*a*.

In a different embodiment of the present invention, the fiber 401' (FIG. 8*b*) can be made of a polymer that has a plurality of molecules 79 to render the fiber 401' (and thus the collection areas 23, 123 and 223 of FIGS. 4, 5, 6)

hydrophobic. The polymer can be a hydrophobic material such as polystyrene, poly(d,l-lactide), poly(dimethylsiloxane), polypropylene, polyacrylic, polyethylene, etc. The polymer can also be a hydrophobically-modified polymer, such as hydrophobically-modified ethyl hydroxyethyl cellulose. Alternatively, the fiber 401' can be made of glass, ceramic, metal, nylon, cotton or other fabric materials and coated with hydrophobic molecules, such as polysiloxanates, alkylsilane and fluoroalkylsilane. The molecules 79 cause the fiber 401' to become hydrophobic. As such, a hydrophobically-modified mineral particle 72' can be attracted to the hydrophobic fiber 401'. The hydrophobically-modified, or wetted, mineral particle 72' comprises a mineral particle 71 and one or more molecules 73 attached thereon. The molecule 73, or collector, has a functional group 78 attached to the mineral particle 71 and a hydrophobic chain or molecular segment 76. A diagram showing the attraction between the hydrophobic chain or molecular segments 76 and the hydrophobic fiber 401' is shown in FIG. 8b. It should be understood that the particles 72' may be non-mineral and can be some harmful particles in a body of water. Furthermore, the hydrophobic fiber 401' can also be used to attract non-mineral particles. For example, if a non-mineral particle 71' has one or more hydrophobic chains or molecular segments 76, the non-mineral particle 71' is also attracted to the hydrophobic fiber 401'. A diagram showing the attraction between non-mineral particles 71' and the hydrophobic fiber 401' is shown in FIG. 8c. Thus, the hydrophobic fiber 401' can be used in a filter, impeller or conveyor belt (similar to those shown in FIGS. 4-6) for water-pollution control, water purification, etc.

The surfaces and edges around the openings or surface structures 701, 702, 703, 704 (FIGS. 7a-7d) can be functionalized to provide the molecules 73 (FIGS. 9a, 9b). The exposed surfaces and edges around the openings or surface structures 701, 702, 703, 704 are represented by surface portions 403, 403' as shown in FIGS. 9a-9c. The length L of the surface portions 403, 403' can be equal to the thickness of the impeller 20, conveyor belt 120 and filter 220 (FIGS. 4-6). As with the fiber 401 as shown in FIG. 8a, the surface portion 403 can be made of a polymer that has a plurality of molecules 73 to provide the functional group 78 and the attaching molecular segment 76. In a different embodiment, the surface portion 403 is coated with polymer that has the molecules 73 to provide the functional group 78 and the attaching molecular segment 76. The surface portion 403 can be made of glass, ceramic, metal, nylon, cotton or a different polymer. The functional group 78 is used to attract mineral particles 72. A diagram of the surface portion 403 and the attached molecules 73 is shown in FIG. 9a.

In a different embodiment of the present invention, the surface portion 403' can be made of a polymer having a plurality of molecules 79 that render the surface portion 403' (and thus the collection areas 23, 123 and 223 of FIGS. 4, 5, 6) hydrophobic. As with the hydrophobic fiber 401' as shown in FIGS. 8b and 8c, the polymer can be a hydrophobic material such as polystyrene, poly(d,l-lactide), poly (dimethylsiloxane), polypropylene, polyacrylic, polyethylene, etc. The polymer can also be a hydrophobically-modified polymer, such as hydrophobically-modified ethyl hydroxyethyl cellulose. Alternatively, the surface portion 403' can be made of glass, ceramic, metal, nylon, cotton or other fabric materials and coated with hydrophobic molecules, such as polysiloxanates, alkylsilane and fluoroalkylsilane. The molecules 79 cause the surface portion 403' to become hydrophobic. As such, a hydrophobically-modified mineral particle 72' is attracted to the hydrophobic surface portion 403'. A diagram showing the attraction between the molecular segments 76 and the hydrophobic surface portion 403' is shown in FIG. 9b. It should be understood that the particles 72' may be non-mineral and can be some harmful particles in a body of water. Furthermore, the hydrophobic surface portion 403' can also be used to attract non-mineral particles. For example, if a non-mineral particle 71' has one or more hydrophobic chains or molecular segments 76, the non-mineral particle 71' is also attracted to the hydrophobic surface portion 403'. A diagram showing the attraction between the non-mineral particles 71' and the hydrophobic surface portion 403' is shown in FIG. 9c. Thus, a filter, impeller or conveyor belt (similar to those shown in FIGS. 4-6) that has hydrophobic surface portions 403' can also be used for water-pollution control, water purification, etc. to rid of hydrophobically-modified particles 72' which may not be a mineral of interest, but some metal harmful to the environment.

The treatment of plain surface 706 (FIG. 7f) can be made similar to the surface portions 403, 403' as shown in FIGS. 9a-9c. That is, the plain surface 706 can be functionalized to provide a functional group 78 as shown in FIG. 9a. The plain surface 706 can also be functionalized to be hydrophobic, as shown in FIGS. 9b and 9c.

It should be understood that, when the collection area 23 of the impeller 20 (FIG. 4), the collection area 123 of the conveyor belt 120 (FIG. 5) and the collection area 223 of the filter 220 (FIG. 6) are functionalized to be hydrophobic, the pulp slurry 11 (FIG. 1a), the pulp slurry 101 (FIG. 2) and the pulp slurry 201 (FIG. 3) must be mixed with collector molecules such as xanthates so that the mineral particles 71 (FIGS. 8b and 9b) in the slurry may be hydrophobically modified with the collector molecules 73 to become wetted mineral particles 72'.

Figure 10A:
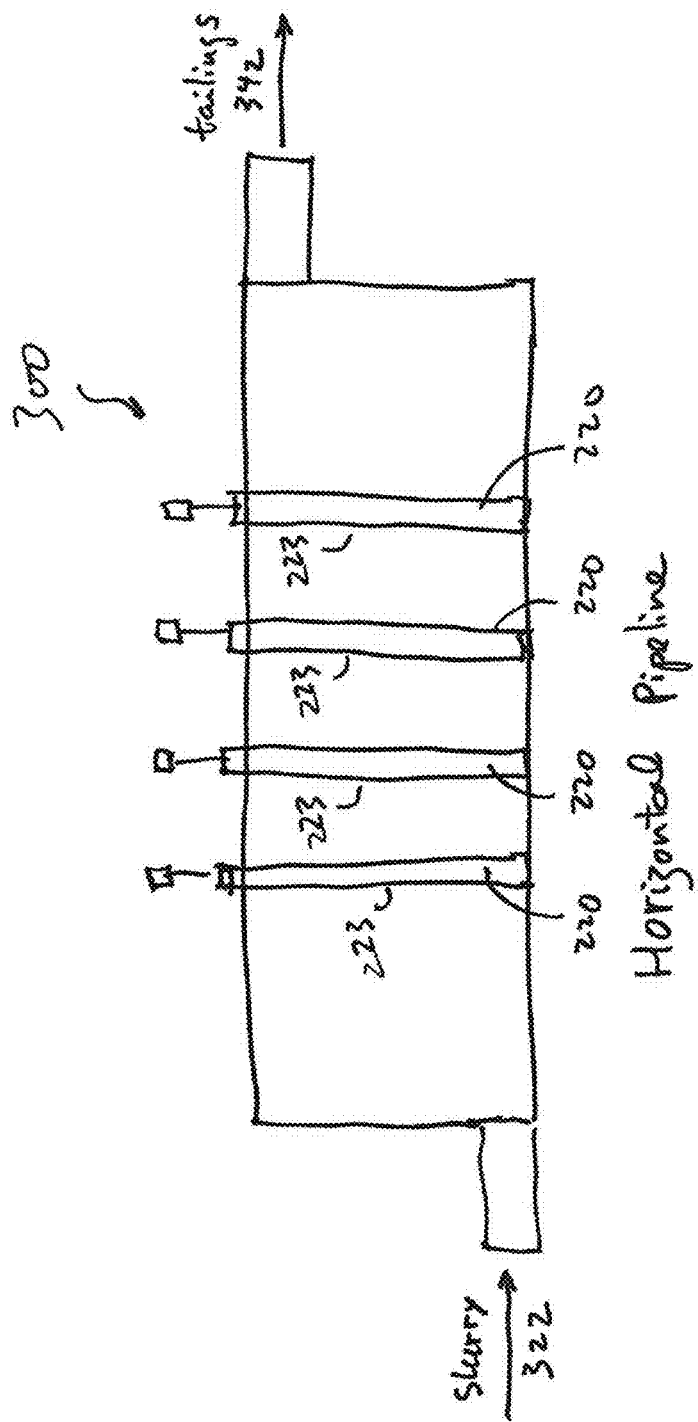
FIG. 10a illustrates a plurality of filters placed in a horizontal pipeline to collect mineral particles, according to some embodiments of the present invention.
Figure 10B:
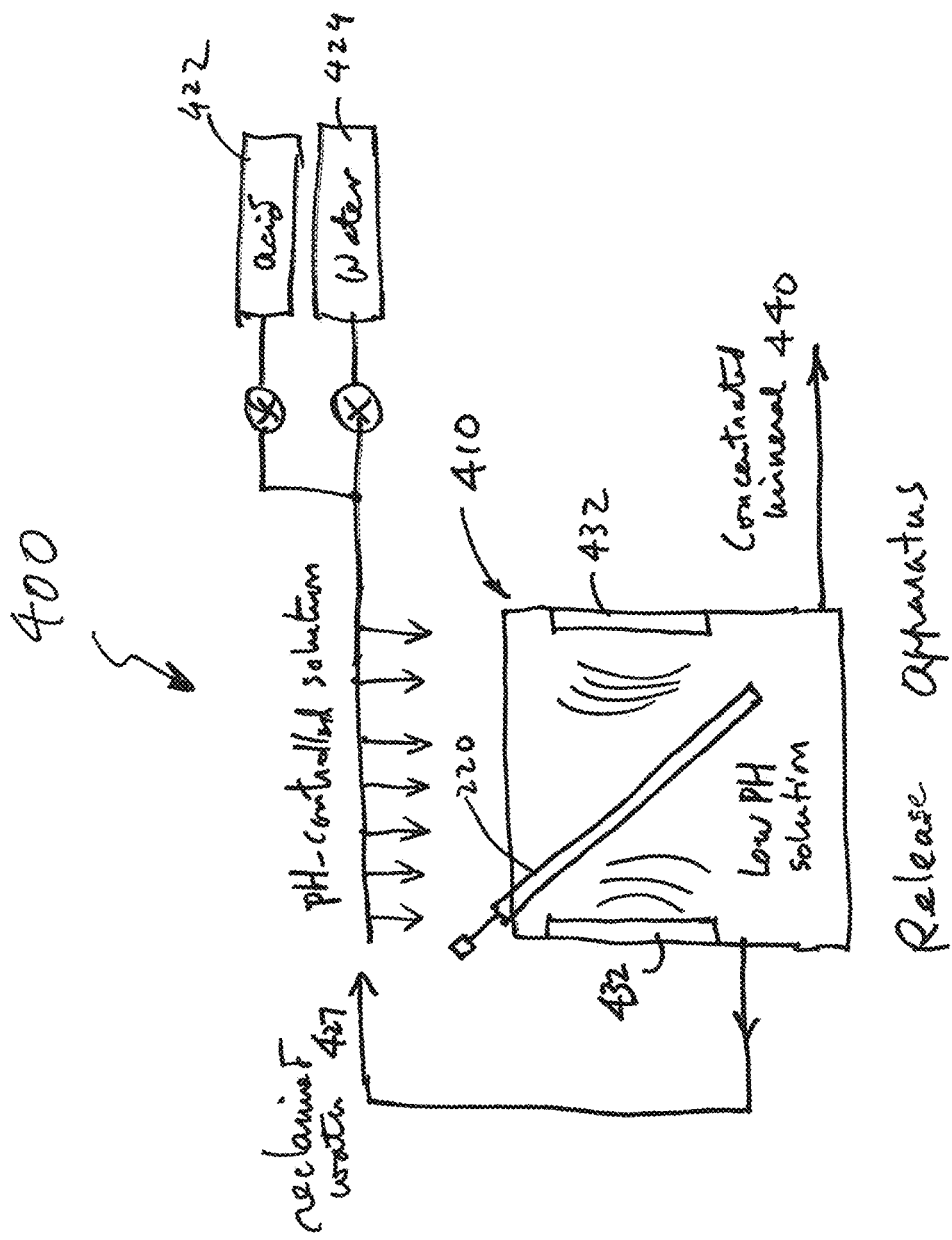
FIG. 10b illustrates a release apparatus configured to release mineral particles from a filter, according to some embodiments of the present invention.

In a different embodiment of the present invention, the impeller 20 (FIG. 1a), the conveyor belt 120 (FIG. 2) and the filter 220 (FIG. 3) are used in a horizontal pipeline for mineral separation. Furthermore, a group of filters 220 can be used in a first processor 202 as shown in FIG. 3. By way of example, a plurality of filters 220 are placed into a horizontal pipeline 300 to collect the valuable material in the slurry 322, as shown in FIG. 10a. As the slurry passes through the filters 220, some of the mineral particles in the slurry will become attached to collection area 223 and the openings (see FIGS. 7a-7e). With such an arrangement, one or more of the filters 220 can be taken out of the horizontal pipeline 300 for mineral releasing (see FIG. 10b) while other filters 220 continue to collect the mineral particles. The tailings 342 can be discharged or transported to a tailings pond or the like (see FIG. 11). The attached mineral particles on the filter 220 can be released in a release rich environment with a low pH solution and/or ultrasonic agitation. The pH value of the low pH solution can be 0 to 7, for example. As shown in FIG. 10b, the filter 220 with collected mineral particles can be placed in a releasing apparatus 410 to be washed with a mixture of acid and water provided by water container 424 and acid container 422. One or more ultrasonic sources 432 may be used to shake loose the attached mineral particles from the filter 220. In one embodiment of the present invention, the filter 200 comprises a panel, such as a glass panel, a ceramic panel, a metal sheet, a plastic sheet, wherein the panel is coated with a polymer or the polymer-coated material comprising a plurality of molecules configured to attract the mineral particles. The surface of the panel can be a plain surface as shown in FIG. 7f. The reclaimed water 427 can be channeled back for reuse. The concentrated mineral 440 can be taken out of the releasing apparatus 410.

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the polymer or the polymer-coated beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Applications

The scope of the invention is described in relation to mineral separation, including the separation of copper from ore.

By way of example, applications are envisioned to include

Rougher/scavenger separation cells in the production stream, replacing the traditional flotation machines.

Tailings scavenger cells are used to scavenge the unrecovered minerals from a tailings stream.

Tailings cleaning cell is used to clean unwanted material from the tailings stream before it is sent to the disposal pond.

Tailings reclamation machine that is placed in the tailings pond to recover valuable mineral that has been sent to the tailings pond.

It should be understood that, the filter 220 (FIGS. 3, 6) can also be used for mineral recovery in a tailings point. By way of example, one or more filters 220 may be placed in a tailings pond 350 to collect the mineral particles in the tailings 342. In order to increase the contact between the collection area 223 and the tailings 342 in the pond 350, it is possible to move the filters 220 back and forth as indicated by arrows A and B. It is understood that when the collection area 223 of the filter 220 is functionalized to be hydrophobic, collector molecules such as xanthates should be added into the tailings 342 so that the mineral particles in the tailings can be wetted.

It should be understood that the polymer or the polymer-coated beads and filters according to the present invention, whether functionalized to have a collector or functionalized to be hydrophobic, are also configured for use in oilsands separation—to separate bitumen from sand and water in the recovery of bitumen in an oilsands mining operation.

Other types or kinds of valuable material or minerals of interest, include gold, molybdenum, etc.

However, the scope of the invention is intended to include other types or kinds of applications either now known or later developed in the future.

FIG. 12a-14b

Different Embodiments

On the collection areas 23, 123, 223 of the impeller 20, conveyor belt 120 and filter 220 as shown in FIGS. 4-7f, the collection surfaces on the surface structures are coated with a polymer or the polymer-coated material having particular molecules to attract mineral particles. In different embodiments of the present invention, the polymer or the polymer-coated material can be used to provide those particular molecules on beads or bubbles, or to make the beads or bubbles (see FIG. 13a-14b). The bubbles or beads that have the particular molecules to attract mineral particles are herein referred to as polymer or the polymer-coated bubbles or beads. By way of example, the polymer or the polymer-coated beads or bubbles 170 are used in an impeller or a filter to collect mineral particles 72, 72' (see FIGS. 8a-9b, 13a-14b). As shown in FIG. 12a, the impeller uses a cage or the like to contain a plurality of polymer or the polymer-coated beads to provide the collection surfaces in the collection area 23. As shown in FIG. 12b, the filter uses a cage or the like to contain a plurality of polymer or the polymer-coated beads 170 to provide the collection surfaces in the collection area 223. When the polymer or the polymer-coated beads or bubbles 170 are used to collect valuable material in a tailings pond 350 (FIG. 11), they can be put in a sack 320 as shown in FIG. 12c. As with the polymer or the polymer-coated material that is used on the collection surfaces 403, 403' (FIGS. 9a-9c), the polymer or the polymer-coated material to be used on the polymer or the polymer-coated beads or bubbles 170 may have the functional groups 78 to attract the mineral particles 72, or may have the hydrophobic molecules 79.

Figure 13B:
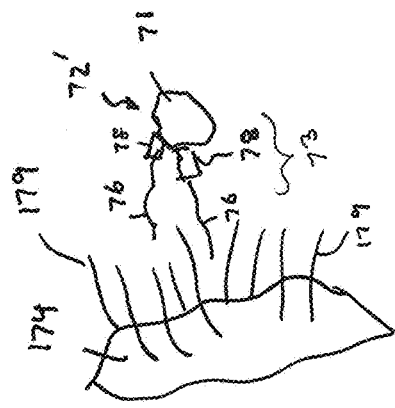
FIG. 13b is an enlarged surface portion of the synthetic bead functionalized to attract wetted mineral particles, according to some embodiments of the present invention.
Figure 13C:
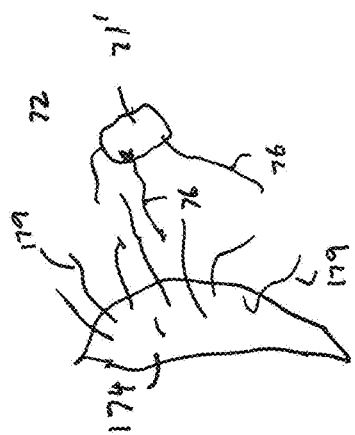
FIG. 13c is an enlarged surface portion of the synthetic bead functionalized to attract non-mineral hydrophobic particles, according to some embodiments of the present invention.
Figure 13A:
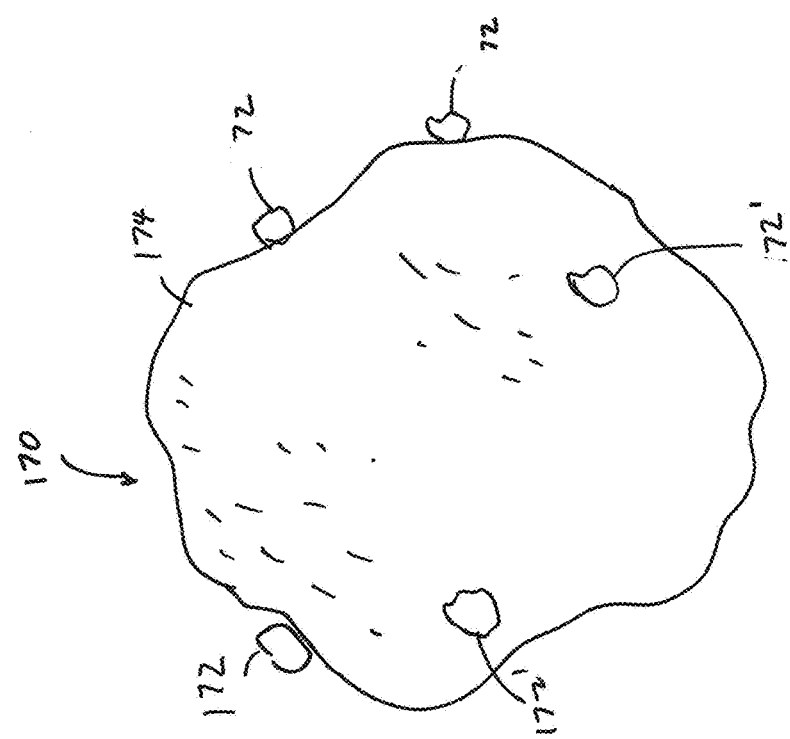
FIG. 13a illustrates a synthetic bead functionalized to attract hydrophobic particles, according to some embodiments of the present invention.

FIG. 13a illustrates a polymer or the polymer-coated bead functionalized to attract hydrophobic particles. As shown in FIG. 13a, the polymer or the polymer-coated bubble or bead 170 has a solid-phase bead body to provide a bead surface 174. At least the outside part of the bead body is made of a synthetic material, such as a hydrophobic polymer, or a coating of a hydrophobic chemical. As shown in FIGS. 13a and 13b, the surface 174 of the synthetic bubble or bead comprises a plurality of molecules 79 which renders the surface 174 hydrophobic. For example, the surface 174 may be a glass surface coated with polysiloxanates which can bind to the hydroxyl group of the glass surface. Polysiloxanates, such as hydroxyl-terminated polydimethysiloxanes, have a silicon-oxygen chain to provide the hydrophobic molecules 79. The hydrophobic particle 72', as shown in FIG. 13b, can be a mineral particle 71 having one or more collectors 73 attached thereto. One end (78) of the collector 73 has an ionizing bond attached to the mineral particle 71. The other end of the collector 73 has a hydrophobic chain 76 which tends to move into the hydrophobic molecules 79. Thus, the hydrophobic particle 72' can be a wetted mineral particle. A collector, such as xanthate, has both the functional group 78 and the molecule 76. The hydrophobic particle 72, as shown in FIG. 13c, can be a particle 71' that has a hydrophobic chain 76. Such particle can be non-mineral related, but it can be arranged to contact with the hydrophobic polymer or the polymer-coated bubbles or beads 170 of the present inventions. Likewise, the particle 71 may be non-mineral and can be harmful to the environment. Thus the hydrophobic bubbles or beads 170, according to the present invention, can be used in non-mining applications, such as water-pollution control and water purification. The size of the polymer or the polymer-coated bead can be smaller than the minimum size of the mineral particles which is about 150 μm, and can be larger than the maximum size of the mineral particles. In certain applications, the size of the polymer or the polymer-coated bead can be 1 cm or larger.

Figure 14B:
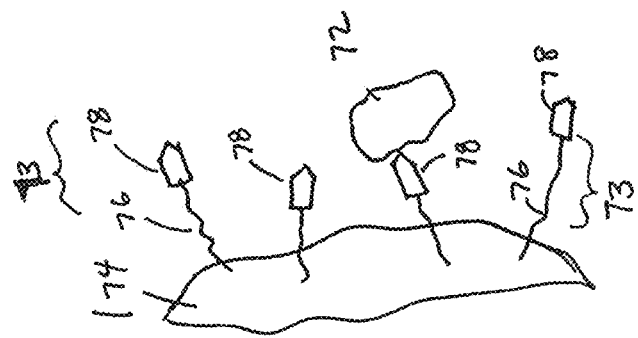
FIG. 14b is an enlarged surface portion of the synthetic bead functionalized to attract mineral particles, according to some embodiments of the present invention.
Figure 14A:
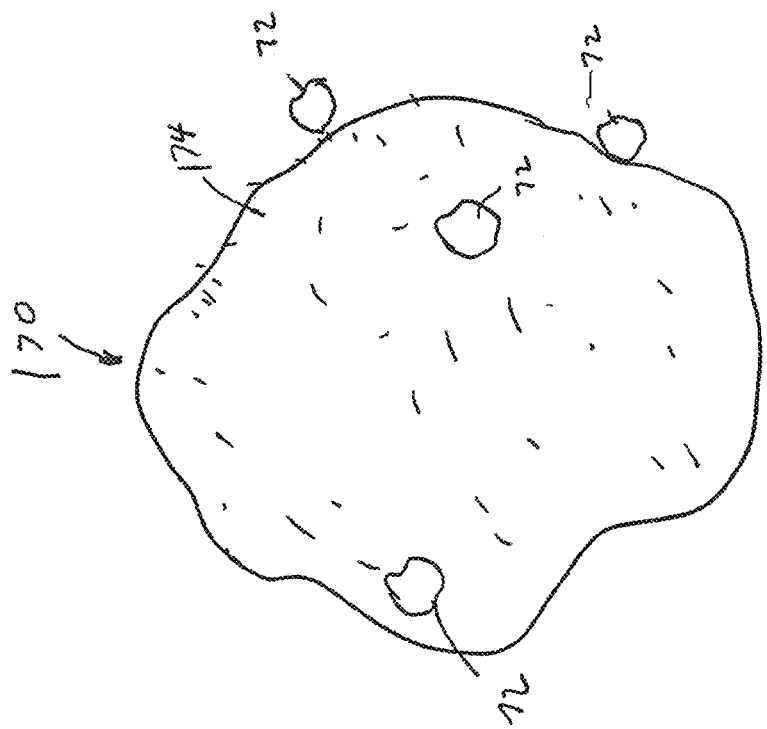
FIG. 14a illustrates a synthetic bead having a functional group to attract mineral particles according to some embodiments of the present invention.

FIG. 14a illustrates a polymer or the polymer-coated bead having a functional group to attract mineral particles. The polymer or the polymer-coated bead 170 has a bead body to provide a bead surface 174 to attract mineral particles 72. FIG. 14b is an enlarged surface of the polymer or the polymer-coated bead functionalized to attract mineral particles. At least the outside part of the bead body is made of a synthetic material, such as polymer, so as to provide a plurality of molecules or molecular segments 76 on the surface 174. The molecule 76 is used to attach a chemical functional group 78 to the surface 174. In general, the molecule 76 can be a hydrocarbon chain, for example, and the functional group 78 can have an anionic bond for attracting a mineral, such as copper to the surface 174. A xanthate, for example, has both the functional group 78 and the molecular segment 76 to be incorporated into the polymer that is used to make the polymer or the polymer-coated bead 70. The functional group 78 is also known as a collector that can have a non-ionizing or ionizing bond to attract the mineral particles 72. Similarly, a chelating agent can be incorporated into the polymer as a collector site for attracting a mineral, such as copper.

The releasing of the mineral particles from the polymer or the polymer-coated beads can be similar to the releasing of the mineral particles from the impeller, conveyor belt or the filter. For example, after the polymer or the polymer-coated beads 170 in the collection area 23 or 223 or in the sack 320 (FIG. 12a-12c) have collected a certain amount of mineral particles, the polymer or the polymer-coated beads 170 can be made contact with a low pH solution and/or subjected to ultrasonic agitation (e.g., FIG. 10b) in order to release the mineral particles. However, a high pH solution can also be used for releasing certain mineral particles while a low pH environment is used for mineral attachment.

According to some embodiments of the present invention, only a portion of the surface of the synthetic bead is functionalized to be hydrophobic. This has the benefits as follows:
1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of
1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

Figure 15A:
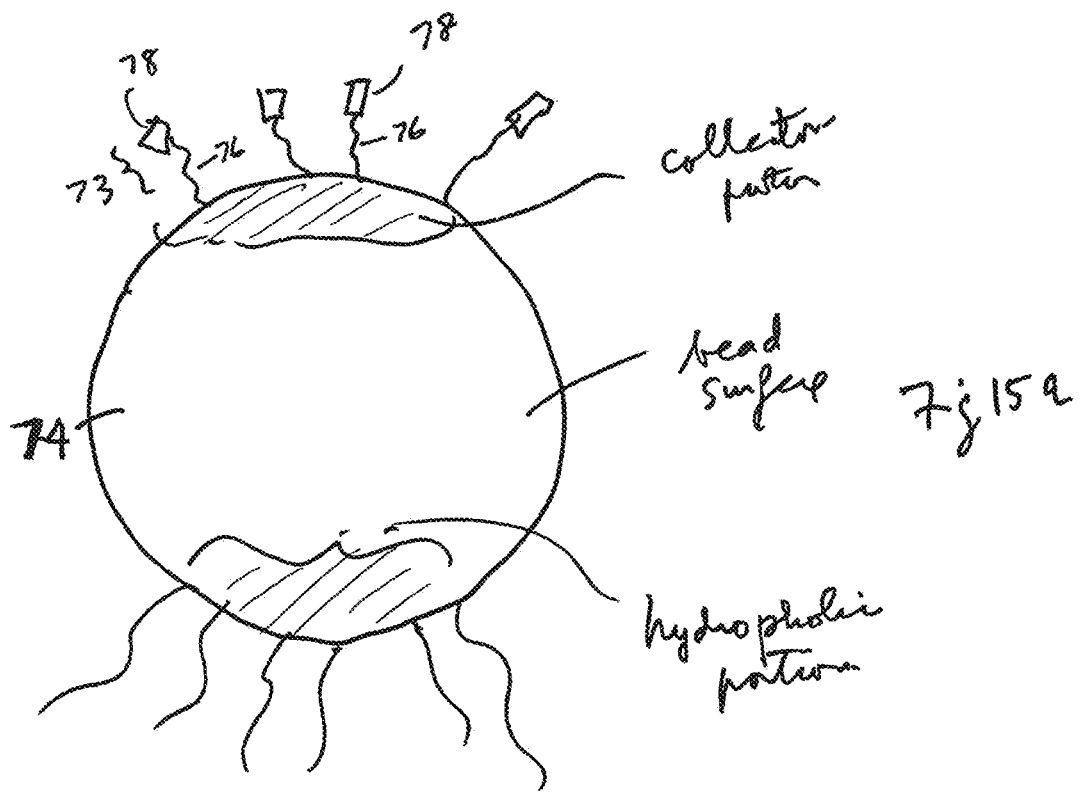
FIGS. 15a and 15b illustrate some embodiments of the present invention wherein the synthetic bead or bubble have one portion functionalized to have collector molecules and another portion functionalized to be hydrophobic, according to some embodiments of the present invention.
Figure 15B:
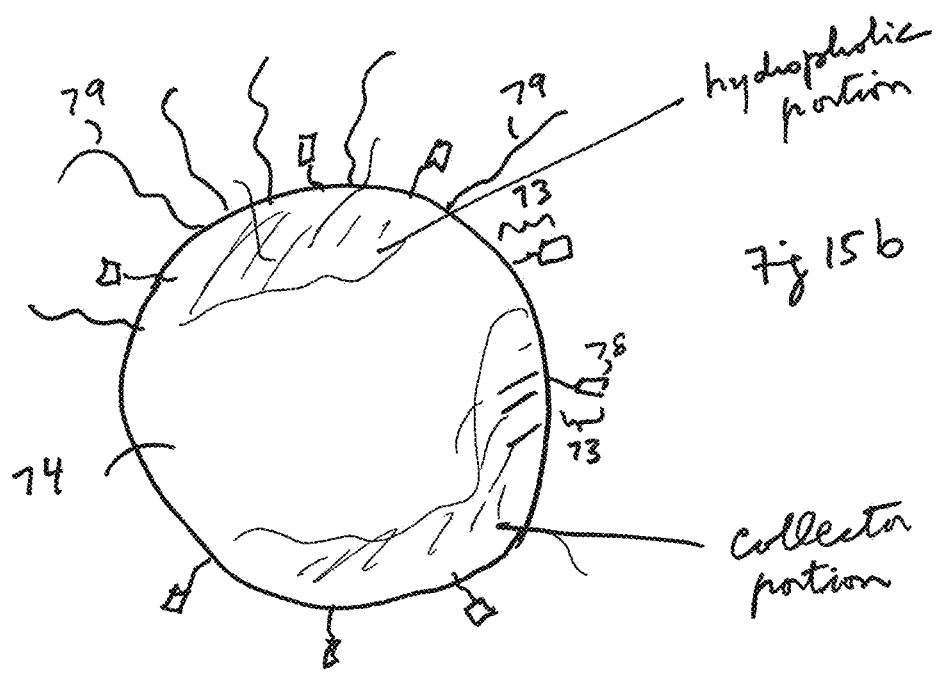

According to some embodiments of the present invention, one part of the synthetic bead is functionalized with collectors while another part of same synthetic bead is functionalized to be hydrophobic as shown in FIGS. 15a and 15b. As shown in FIG. 15a, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 79. In the embodiment as shown in FIG. 15b, the entire surface of the synthetic bead 74 can be functionalized to have collector molecules 73, but a portion of the surface is functionalized to have hydrophobic molecules 79 render it hydrophobic.

This "hybrid" synthetic bead can collect mineral particles that are wet and not wet.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

THE SCOPE OF THE INVENTION

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:
1. An apparatus comprising:
   a collection area comprising a plurality of cords, strings or ropes made from poly-paraphenylene terephthalamide, the cords, strings or ropes having collection surfaces configured to contact with a mixture comprising water and valuable material, the valuable material comprising a plurality of mineral particles; and
   the collection surfaces comprising a coating material made of a siloxane derivative to attract the mineral particles to the collection surfaces.
2. The apparatus according to claim 1, wherein the coating material comprises a chemical functional group for bonding the mineral particles to the collection surface.
3. The apparatus according to claim 1, wherein the coating material is configured to render the collection surfaces hydrophobic.
4. The apparatus according to claim 3, wherein the mineral particles comprise one or more hydrophobic molecular segments attached thereon.
5. The apparatus according to claim 1, wherein the siloxane derivative comprises polydimethylsiloxane, hydrophobically-modified ethyl hydroxyethyl cellulose polysiloxanates, polysiloxanates or hydroxyl-terminated polydimethylsiloxanes.
6. The apparatus according to claim 1, wherein the mixture further comprises a plurality of collector molecules, and each of the collector molecules comprises a hydrophobic molecular segment and an ionizing bond bonding to the mineral particle.
7. A method comprising:
   providing a filter member made of a plurality of cords, strings or ropes, the plurality of cords, strings or ropes made from poly-paraphenylene terephthalamide, the cords, strings or ropes having collection surfaces configured to contact with a mixture comprising water and valuable material, the valuable material comprising a plurality of mineral particles; and providing a coating material made of a siloxane derivative on the collection surfaces to attract the mineral particles to the collection surfaces.

8. The method according to claim 7, wherein the coating material is configured to render the collection surfaces hydrophobic.

9. The method according to claim 8, wherein the mineral particles comprise one or more hydrophobic molecular segments attached thereon.

10. The method according to claim 7, wherein the siloxane derivative comprises polydimethylsiloxane, hydrophobically-modified ethyl hydroxyethyl cellulose polysiloxanates, polysiloxanates or hydroxyl-terminated polydimethylsiloxanes.

11. The method according to claim 7, further comprising:
providing collector molecules in the mixture, the collector molecules comprising a first end and a second end, the first end comprising a functional group configured to attach to the mineral particles, the second end comprising a hydrophobic molecular segment.

12. The method according to claim 11, wherein the collector molecules comprise xanthates.

13. The method according to claim 7, wherein the filter member is arranged in a tailings pond, said method further comprising
moving the filter member back and forth in the tailings pond for collecting the mineral particles.

* * * * *